(12) United States Patent
Korniski et al.

(10) Patent No.: US 6,646,799 B1
(45) Date of Patent: Nov. 11, 2003

(54) SYSTEM AND METHOD FOR COMBINING MULTIPLE ENERGY BANDS TO IMPROVE SCENE VIEWING

(75) Inventors: Ronald James Korniski, Thousand Oaks, CA (US); William Henry Dyer, Shelton, CT (US); Peter Spiro Paicopolis, Monkton, MD (US)

(73) Assignee: Science Applications International Corporation, San Diego, CA (US)

( * ) Notice: Subject to any disclaimer, the term of this patent is extended or adjusted under 35 U.S.C. 154(b) by 22 days.

(21) Appl. No.: 09/651,111

(22) Filed: Aug. 30, 2000

(51) Int. Cl.⁷ ............................................. G02B 23/00
(52) U.S. Cl. ................... 359/407; 359/350; 359/630; 359/363; 359/400
(58) Field of Search ................. 359/350, 353, 359/355, 630, 631, 633, 634, 637, 728, 729, 834, 857, 859, 407, 399, 363, 400

(56) References Cited

U.S. PATENT DOCUMENTS

| | | | | |
|---|---|---|---|---|
| 3,745,347 A | * | 7/1973 | DeBrey et al. | 250/83.3 |
| 5,373,182 A | | 12/1994 | Norton | 257/440 |
| 5,432,374 A | | 7/1995 | Norton | 257/442 |
| 5,729,016 A | | 3/1998 | Klapper et al. | 250/334 |
| 5,808,350 A | | 9/1998 | Jack et al. | 257/440 |
| 5,880,888 A | | 3/1999 | Shoenmakers et al. | 359/631 |
| 5,907,150 A | | 5/1999 | Saldana | 250/214 VT |
| 5,909,244 A | | 6/1999 | Waxman et al. | 348/222 |
| 5,933,277 A | | 8/1999 | Troxell et al. | 359/573 |
| 5,943,174 A | | 8/1999 | Bryant et al. | 359/809 |
| 6,061,182 A | | 5/2000 | Carmeli et al. | 359/629 |
| 6,204,961 B1 | * | 3/2001 | Anderson et al. | 359/353 |
| 6,366,399 B1 | * | 4/2002 | Rogers | 359/432 |

OTHER PUBLICATIONS

Scribner, D., Schuler, J., Warren, P., Howard, G., Klein, R., "Melding Images for Information", *Spie's OE Magazine*, Sep. 2002, pp. 24–26.

Lareau, A. G., "Tactical Airborne Reconnaissance Goes Dual–Band and Beyond", *Photonics Spectra*, Jul. 2002, pp. 64–68.

Fallon, M., "Infrared and Visible Imaging Combined in One Camera", *Photonics Spectra*, Dec. 2001, pp. 119–121.

Handley, R., "Multispectral and Thermal Imaging", www.advancedimagingmag.com, Mar. 2001, pg. 45.

* cited by examiner

*Primary Examiner*—Mark A. Robinson
(74) *Attorney, Agent, or Firm*—Kilpatrick Stockton LLP

(57) ABSTRACT

A single sensor that can operate in multiple bands and display either one radiation band alone or multiple overlaid bands, using an appropriate color choice to distinguish the bands. The multiple-band sensor allows the user to look through at least one eyepiece and with the use of a switch, see scenes formed via the human eye under visible light, an II sensor, an MWIR sensor, or an LWIR sensor, either individually or superimposed. The device is equipped with multiple switching mechanisms. The first, for allowing the user to select between radiation bands and overlays, and the second, as with most thermal imaging sensors, for allowing the user to switch between "white-hot/black-hot" i.e., a polarity switch.

26 Claims, 25 Drawing Sheets

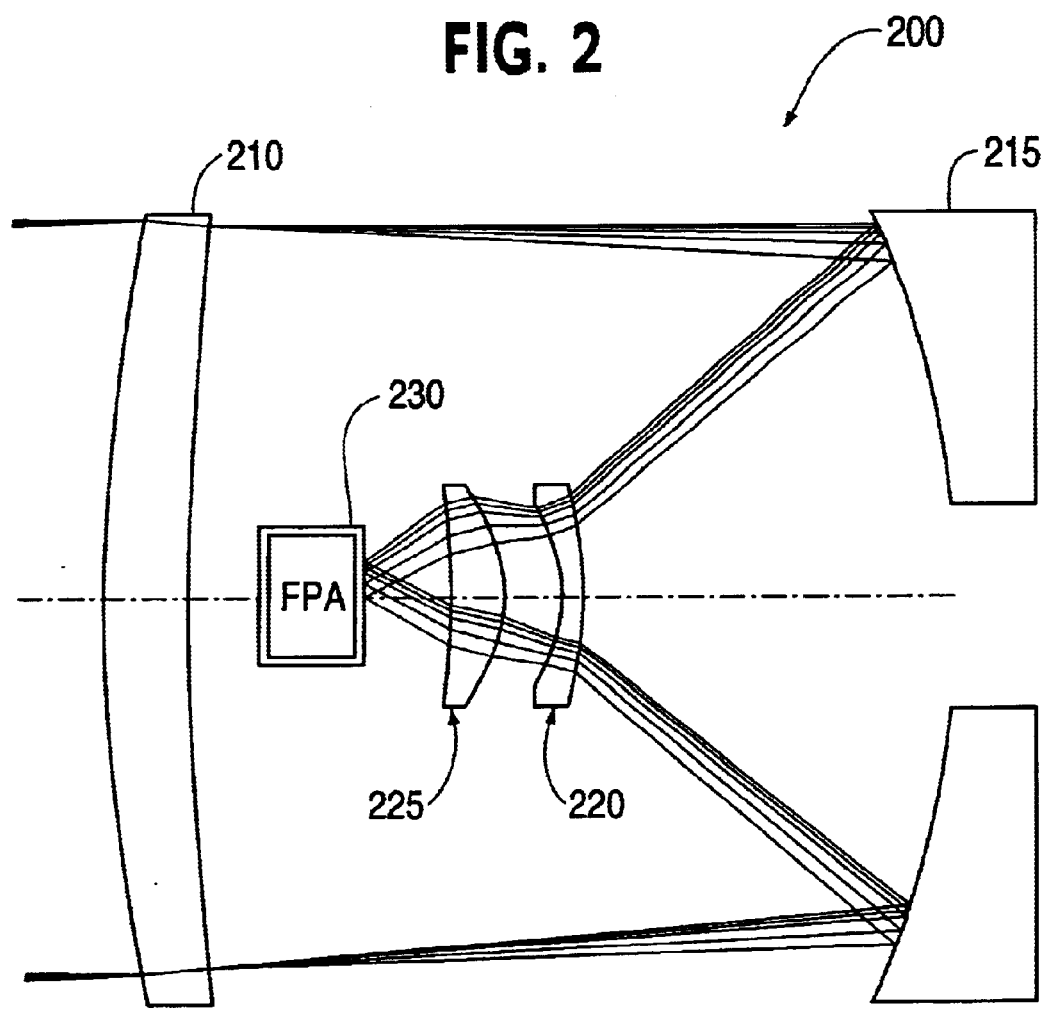

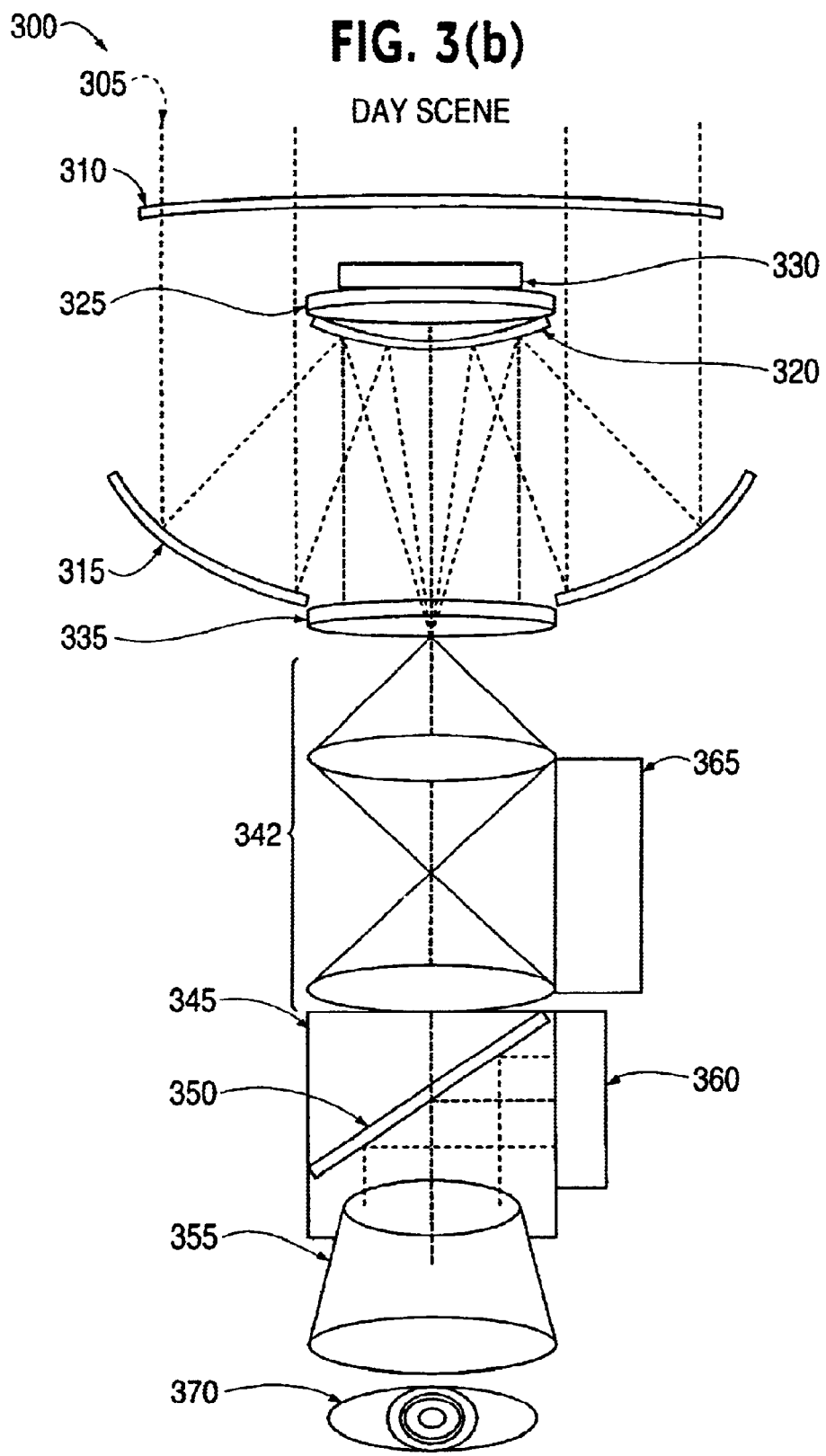

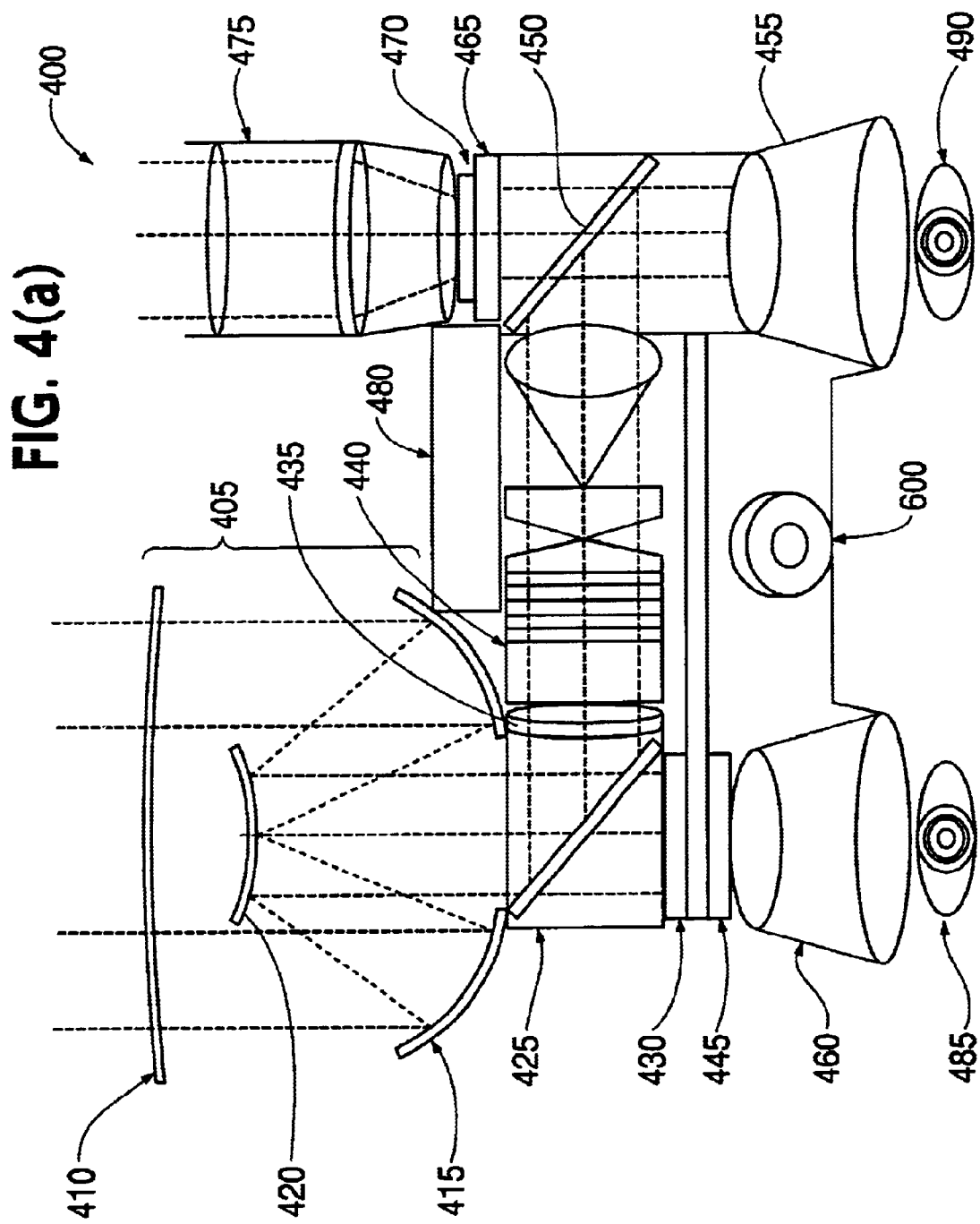

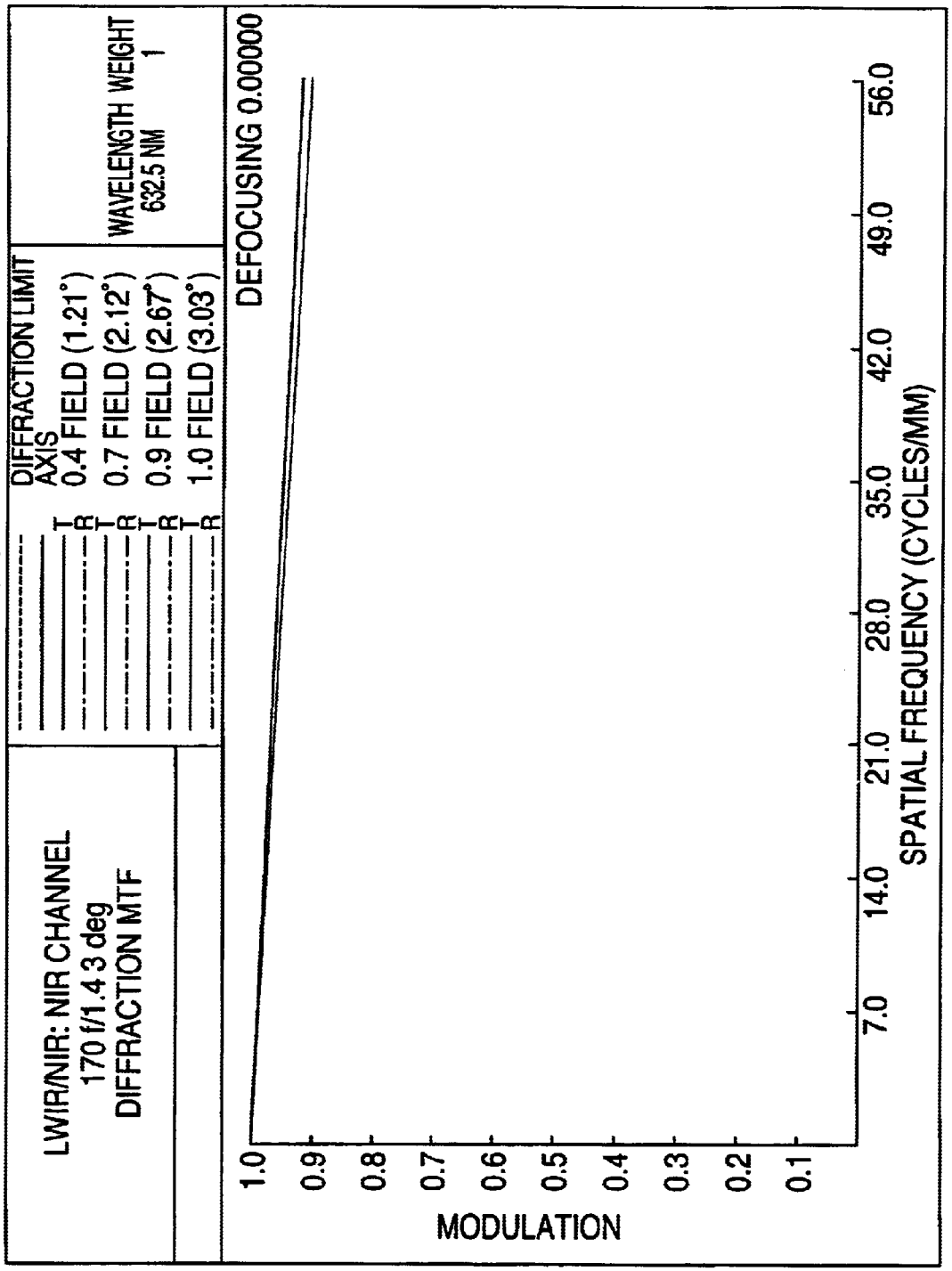

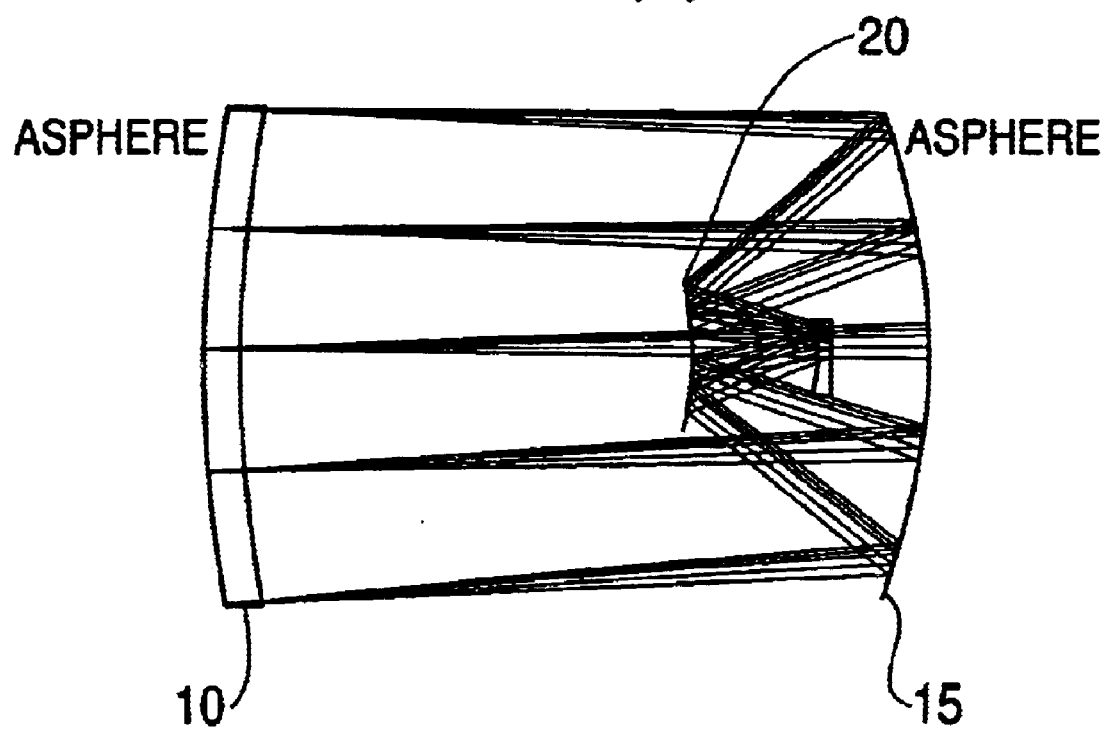

SYSTEM AND METHOD FOR COMBINING MULTIPLE ENERGY BANDS TO IMPROVE SCENE VIEWING

BACKGROUND OF THE INVENTION

1. Field of the Invention

The invention pertains generally to imaging using multiple bands of radiation and particularly to the simultaneous imaging of multiple bands of radiation to form a scene for viewing by a user.

2. Description of Related Art

Currently, an individual seeking to view objects in dark, low level light conditions and/or poor atmospheric conditions, may rely on either image intensification sensors for the visible/near-wavelength infrared ("referred to hereafter as VIS/NIR") or thermal infrared (IR) sensors. Further, within the IR range, separate detectors are necessary in order to detect both mid-wavelength IR ("MWIR") and long-wavelength IR ("LWIR"). No single detection system allows an individual to simultaneously view any two of these wavelength ranges. Each sensor, independently, has significant advantages in, for example, a wide variety of military scenarios. The IR is better at detecting all types of items (e.g., targets) under most light level and meteorological conditions. Camouflage and obscurants are much less effective in the thermal band than in the VIS/NIR. However, many night missions, especially those in urban settings, favor the image intensification due to the need to read signs (e.g., alphanumerics), see through glass windows, and recognize and differentiate individuals. Unlike VIS/NIR sensors, thermal imagers do not detect lasers operating at 1.06 microns. This is significant because such lasers are used for target ranging and designation. Knowledge of such illumination by friendly or enemy forces can be vital. In addition, image intensification sensors operating in the VIS/NIR (i.e., 0.6 to 1.1 micron range) offer considerably better resolution than the IR sensors.

Uncooled IR sensors (both currently existing and those improvements in development) offer a low cost, low power approach to thermal imaging. Operating in the long wave infrared (LWIR: 7.5 to 14 microns), uncooled thermal imaging is excellent for many military applications because items of interest (e.g., enemy soldiers, vehicles, disrupted earth) almost always emit more in-band (in this case IR) energy than the background. Other applications for uncooled thermal imaging include security, hunting, monitoring and surveillance, firefighting, search and rescue, drug enforcement, border patrol and ship navigation. The current uncooled devices and even those in development (e.g., 640×480 with 25 micron pixels) have significantly lower resolution compared to image intensification (II) devices or daytime telescopes.

Image intensifiers take whatever amount of light is available (e.g., moonlight, starlight, artificial lights such as street lights) and electronically intensify the light and then display the image either directly or through the use of an electronic imaging screen via a magnifier or television-type monitor. Improvements in II technology have resulted in the GEN III OMNI IV 18-mm tube offering the equivalent of more than 2300×2300 pixels. II covers the visible and near infrared (VIS/NIR: 0.6 to 1.1 microns) and overcomes the LWIR limitations listed above. However, II is limited by the ambient light available, targets are harder to find, and camouflage/obscurants (e.g., smoke, dust, fog) are much more effective. While scientists have long seen the complementary nature of LWIR and II to achieve sensor fusion, most attempts involve the use of two parallel sensors and sophisticated computer algorithms to merge the images on a common display, a display with lower resolution than the II tube. This approach is difficult to implement for an individual hand held sensor. Currently, for example, night operations forces often carry both II and LWIR sensors, each with different fields of view and magnification, for special reconnaissance, target interdiction, and strike operations. The synergy noted above is lost because the soldier cannot use the devices simultaneously.

IR imaging devices typically provide monochrome imaging capabilities. In most situations, the ideal viewing scenario would be full color. This is of course achieved in the visible band. There are numerous situations where a user alternates between visible band viewing scenarios and IR band viewing scenarios within the span of seconds. Current imaging devices do not allow a user to either: (a) simultaneously view both the monochrome IR image and the full color visible image, or (b) change between IR monochrome imaging and full-color visible imaging without mechanically altering the imaging device or removing the device from the users field of view (e.g., as in the case of an IR helmet mounted sensor).

BRIEF SUMMARY OF THE INVENTION

The obvious synergy of multiple sensor bands is difficult to achieve and totally impractical for handheld use via separate sensors looking alternately at the same scene. The solution advanced in this application is the development of a single sensor that can operate in multiple bands and display either one radiation band alone or multiple overlaid bands, using an appropriate color choice to distinguish the bands. The multiple-band sensor allows the user to look through at least one eyepiece and with the use of a switch, see scenes formed via the human eye under visible light, an II sensor, an MWIR sensor, or an LWIR sensor, either individually or superimposed. The device is equipped with multiple switching mechanisms. The first, for allowing the user to select between radiation bands and overlays, and the second, as with most thermal imaging sensors, for allowing the user to switch between "white-hot/black-hot" i.e., a polarity switch.

A further feature of the present invention is a multiple-band objective lens for imaging multiple bands of incoming radiation, including at least two of the visible band, the VIS/NIR band, the MWIR band or the LWIR band.

A further feature of the present invention is range focusing capability of the sensors which, simultaneously, is from 3 meters to infinity over a full military temperature range.

Further features of the present invention include supporting sensors and corresponding eyepiece displays as well as transmitters used to enhance the usability and efficiency of the multiple-band sensors. For example, a digital compass, a laser range finder, a GPS receiver and IR video imagery components may be integrated into the multiple-band sensor. The multiple-band sensor may also be equipped with an eyepiece for facilitating zoom magnification.

BRIEF DESCRIPTION OF THE DRAWINGS

In the Figures:

FIG. 2 is a combination reflective/refractive objective lens according to an embodiment of the present invention;

FIGS. 3(a) and 3(b) are compact monoculars according to embodiments of the present invention;

FIGS. 4(a) and 4(b) are compact binoculars according to embodiments of the present invention;

FIGS. 5(a) and 5(b) are monochromatic MTF performance graphs for NIR energy passing through a lens configuration according to an embodiment of the present invention;

FIGS. 7(a)–7(d) are objective lenses according to embodiments of the present invention;

DETAILED DESCRIPTION OF THE INVENTION

In forming a multiple-band sensor, there are multiple factors that must be considered in order to optimize the image quality in each band simultaneously. First, it is important to keep the f/number as fast as possible, as the performance of most sensors including, the human eye, uncooled IR, including MWIR and LWIR, as well as II depend on efficient energy collection. Second, depending on the intended use for the multiple-band sensor, the size and weight of the sensor is an important factor. For example, for use as a handheld device, miniaturizing and/or compacting the components of the sensor is quite a challenge. While the size and weight requirements are less limiting for tripod mounted versions of the multiple-band sensor, they are not to be ignored. Third, there is a magnification trade off with the field of view that impacts the image quality and ultimately the design of the multiple-band sensor. A wide field of view is useful in wide area coverage, but limited in target identification and intelligence gathering. Too much magnification requires a heavy lens, which limits the usefulness in a handheld sensor, but is less of an issue in larger fixed (mounted) applications.

Figure 1:
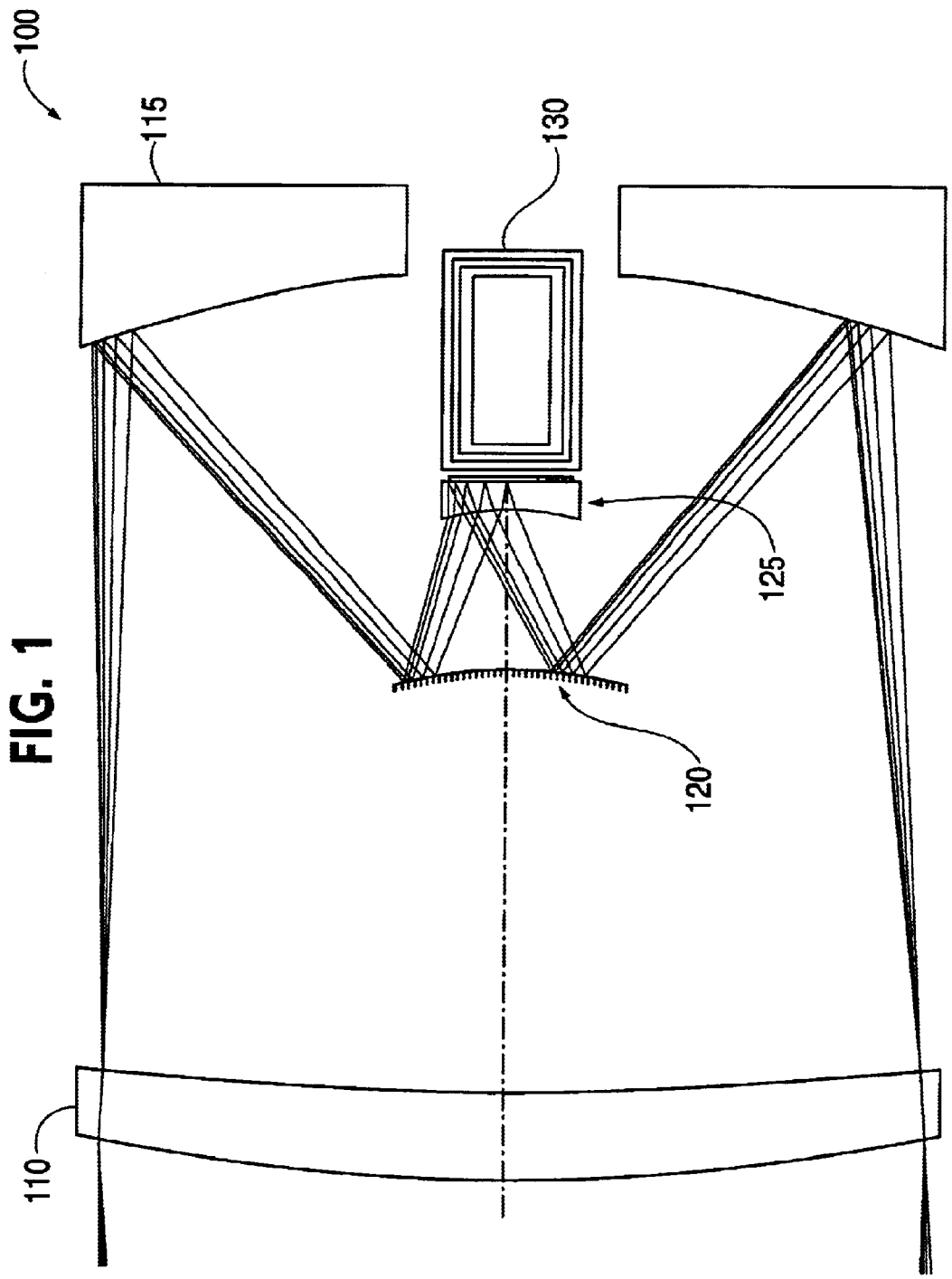
FIG. 1 is a reflective objective lens according to an embodiment of the present invention.

In a preferred embodiment of the present invention a single objective lens, similar to a long range camera lens and telescope, is used to image all incoming bands of energy. In a specific embodiment, the reflective objective lens consists of two mirrors, allowing for a longer focal length in a smaller space than a single mirror would require for the same focal length. This lens configuration shown in FIG. 1 is known as a catadioptric configuration (imaging objectives using powered lenses and mirrors to form the image) consisting of a Cassegrain two-mirror lens with an aperture corrector and a field lens. The Cassegrain portion of the objective lens is a telephoto configuration, which allows it to be compact. Other embodiments may be more elaborate catadioptic set-ups to obtain the desired imaging properties of the objective lens.

The objective lens 100 of FIG. 1 comprises a combination corrector lens/aperture stop 110, a primary component 115, a secondary component 120, and a field lens 125.

In operation, the VIS/NIR energy from the scene impinges upon the corrector lens/aperture stop 110, and bounces off of the primary component 115, which is preferably as large in diameter as the corrector lens 110. The energy then reflects onto and subsequently off of a secondary component 120 that is held in front of the primary component 115, passes through the field lens 125 and forms an image on, for example, an image intensifier (e.g., tube) 130. In this objective embodiment, primary and secondary components are both reflective, but this need not always be the case. FIG. 1 illustrates the VIS/NIR imaging functionality of the multiple-band imaging system and FIG. 2 discussed below illustrates the MWIR and/or LWIR imaging functionality of the multiple-band imaging system.

Referring to FIG. 2, the objective lens 200 comprises a combination corrector lens/aperture stop 210, a primary component 215, a secondary component 220, and a MWIR or LWIR lens component 225. Components 210, 215 and 220 are identical to 110, 115 and 120 of FIG. 1, as these components form a single objective that is capable of imaging multiple bands of radiation, eg., VIS/NIR and MWIR and/or LWIR.

In operation, the MWIR or LWIR energy from the scene impinges upon the corrector lens/aperture stop 210, bounces off of the primary component 215. In this embodiment, the primary component 215 diameter is similar to the corrector lens aperture 210. The energy then reflects onto and through a secondary component 220 that is held in front of the primary component 215, passes through the MWIR or LWIR lens component 225 and forms an image on, for example, an IR focal plane array (IRFPA) or the like 230. This objective is an example of a catadioptric system, wherein both reflective and refractive elements are used to achieve the desired focal points. In this embodiment, the primary component 215 is reflective and the secondary component 220 is refractive.

Figure 3A:
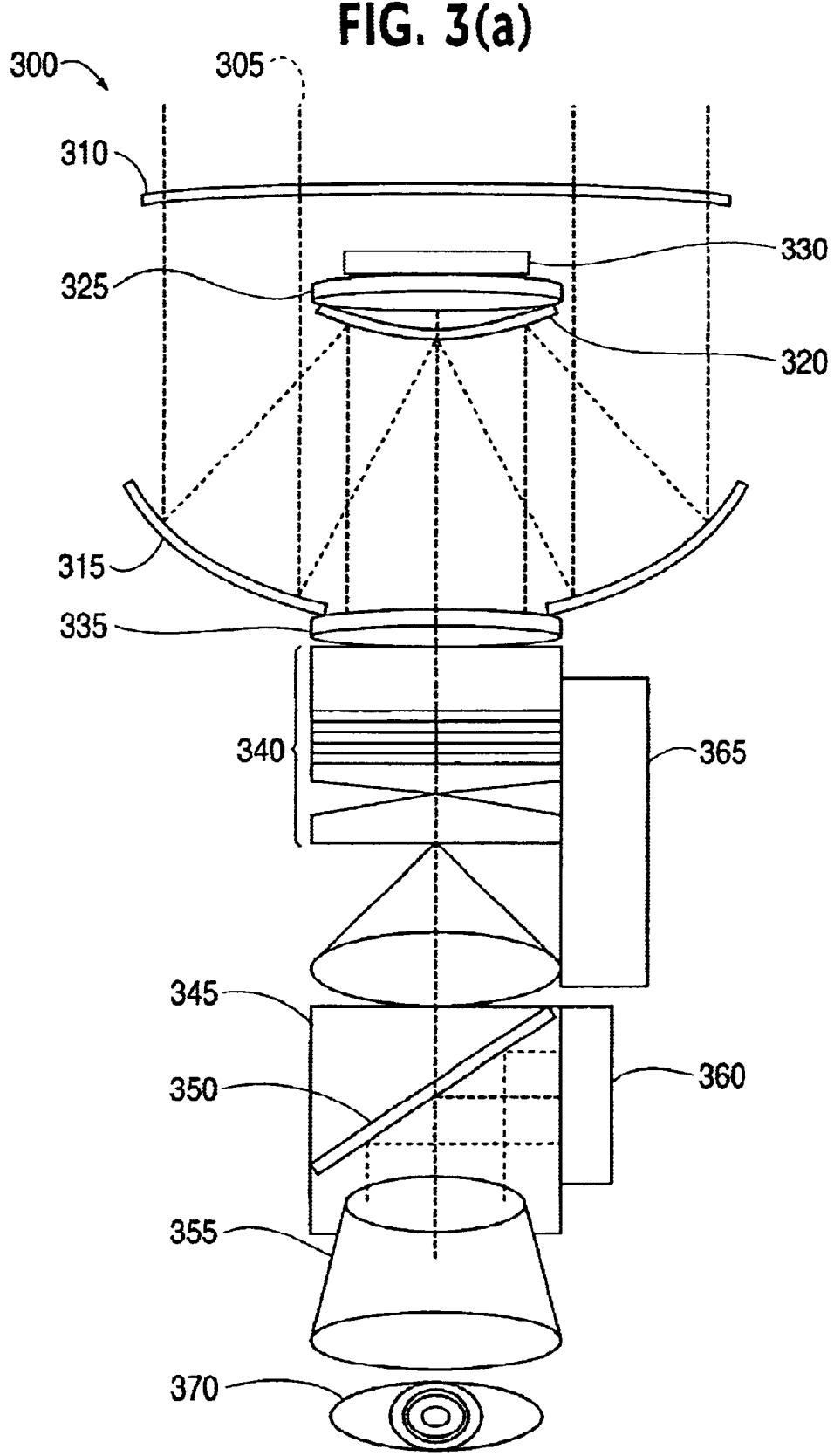

In a first preferred embodiment illustrated in FIGS. 3(a) and 3(b), by combining the elements of the objectives of FIG. 1 and FIG. 2, it is possible to simultaneously image the various energy bands from a scene using a single objective lens in a compact monocular 300.

Referring to FIG. 3(a), the components utilized during the display of a night scene via a compact monocular 300 include a combination corrector lens (e.g., Cleartrane®) 310, a primary component 315, a secondary component 320, one or more MWIR or LWIR aberration correction lenses 325, an IRFPA 330, one or more field lenses 335, an image intensifier 340, and a combining eyepiece (e.g., ANVIS-6 NV/HUD) 345 which includes a image combiner 350, an eyepiece 355, and a display (e.g., active matrix electroluminescent (AMEL) display) 360. Also included in the compact sensor are thermal imager electronics and operator controls (e.g., range focusing mechanism and polarity control) 365. Imaging and sensor electronics are well know to those skilled in the art and will not be discussed further herein.

In operation, all radiation 305, including visible through LWIR impinges upon the combination corrector lens/ aperture stop 310. All radiation is reflected off of the primary component 315 and is directed towards the secondary component 320. The secondary component 320 is designed so as to transmit either MWIR or LWIR or both, depending on the desired application of the monocular, and to reflect VIS/ NIR. The transmitted IR passes through an IR component 325 for correcting aberration and impinges upon an IRFPA, where it is converted into an electronic digital image and then is displayed on, for example, a CRT, AMEL, or some other flat-panel display 360 and ultimately projected into the eye 370 of a user via an imaging system 345.

The VIS/NIR wavelengths are reflected off of the secondary component 320, pass through an aberration correction component 335 and are imaged onto an image intensifier 340 (e.g., II tube). After being intensified, the VIS/NIR scene is directly imaged onto the user's eye 370 via the imaging system 345. The imaging system 345 uses a beam combiner 350 and an eyepiece 355 to superimpose the images onto the user's eye 370. The eyepiece magnifies the output of the electronically intensified VIS/NIR scene and the digitized IR scene from the display onto the viewer's eye 370.

Different colors must be used for the two images combined in the eyepiece 345. The output of the image intensifier 340 has the characteristic yellow green color of the P43 phosphor screen. In order to distinguish the overlaid IR image the output of the IR display 360 must be a different color. The standard ANVIS-6 NV/HUD eyepiece uses an amber display for superimposing information onto the output of the image intensifier. Thus monochrome amber is a good choice for displaying the IR image, but is merely exemplary.

Similarly, referring to FIG. 3(b), the components utilized during the display of a day scene via compact monocular 300 are identical to those of FIG. 3(a) with the exception of the erector lens component 342 which is used to image the visible scene in place of the image intensifier 340 from the night scene.

The compact monocular 300 allows the user to choose between multiple operation viewing modes, without the need to change objective or eyepiece lenses. The same scene, viewed in multiple bands (e.g., VIS/NIR, MWIR, and LWIR), may be imaged through a single eyepiece at the same magnification. Similarly, the user may view the same scene separately using at least two different imaging bands. In order to switch between various modes of operation, a switch is provided. These modes of operation include (1) only II image of the scene, (2) only IR image of the scene, and (3) overlay of the II and IR image of the scene. Further, the monocular in FIG. 3(b) is equipped with optics for viewing scenes during the day without the need for the image intensifier.

The compact monocular 300 of FIG. 3 is preferably sealed to avoid degradation due to exposure to the elements by the combination aberration corrector lens 310. An example of a suitable sealing lens is one made of Cleartran®. While this is a well-recognized type of commercially available material, any lens fabricated from materials (e.g., zinc sulfide, zinc selenide) that transmit both visible, near infrared (NIR), MWIR, and LWIR may be used. One skilled in the art recognizes that it is not always necessary to provide a sealing component 310. In the case of larger aperture multiple-band imagers, sealing from outside elements may not be necessary, due to the size and composite of the components of the imagers and the strong likelihood the unit will remain in a protected location such as a perimeter tower. The unit would be covered when not in use.

For the compact monocular 300 the objective lens has an f/number less than f/1.5 for the image intensifier and closer to f/1.0 for the LWIR channel. In order to achieve this, there will likely be some performance degradation at the edges of the field of view. However, this is deemed acceptable within limits, in that the user of the compact monocular 300 will center the object of interest, as is done with spotting scopes, binoculars, and even the human eye. Such degradation may involve distortion (e.g., barrel or pincushion). Depending on the application the unit is designed to accommodate, the distortion of the objective may be compensated in the eyepiece so that the net system distortion is zero. However, in either case, the distortion that is present must be nearly the same in both the image intensification and thermal channels for comfortable viewing of the images by the user. Also, the thermal image does not have to extend to the circumference of the image intensifier, but the magnification of the scene must be the same.

Figure 4B:
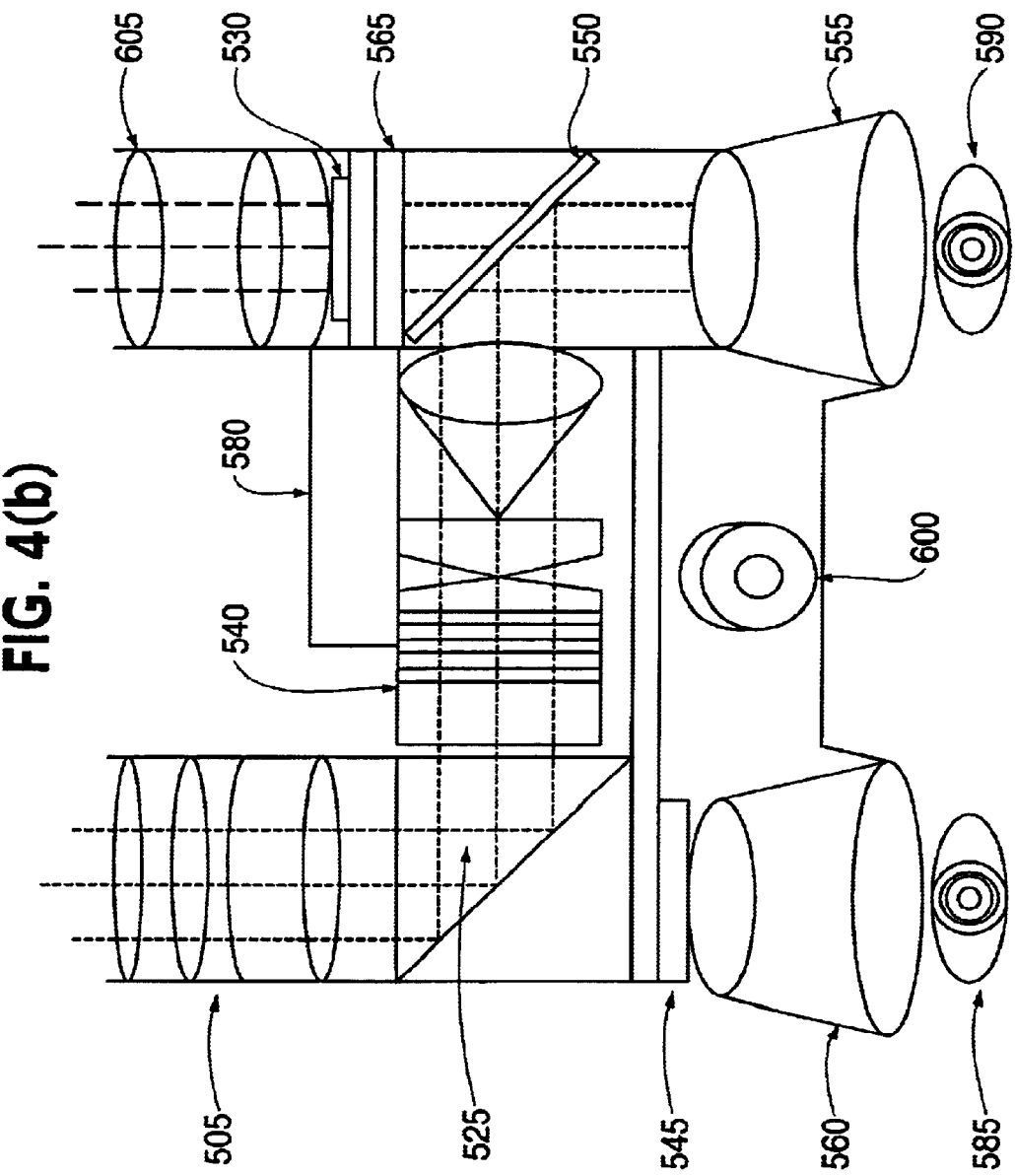

In second and third preferred embodiments, shown in FIGS. 4(a) and 4(b), compact binoculars having multiple-band imaging capabilities are described. Referring to FIG. 4(a), compact binoculars 400 are capable of imaging the VIS/NIR and MWIR or LWIR scenes onto one eye of the user. Also the MWIR or LWIR image can be displayed to the other eye. The same displays are used with the full daylight imaging optics such that the compact binocular 400 is useful during both day and night. In this example, we will refer to the two bands of energy as VIS/NIR and LWIR. The compact binocular 400 comprises an objective lens 405 which includes a combination corrector/sealing lens (e.g., Cleartran®) 410, a primary component 415, and a secondary component 420. Compact binocular 400 further comprises a beam splitter 425, an IRFPA 430, an aberration correction lens 435, image intensifier 440, a first display screen 445, a switchable holographic reflector/filter 450, a first eyepiece 455, a second eyepiece 460, a second display screen 465, a charge-coupled device (CCD) 470, a zoom lens system 475, and thermal imager electronics 480.

In this second preferred embodiment, the LWIR and the VIS/NIR are imaged onto one eye of the viewer 490, with the LWIR image only available to the other eye 485. Both energy bands impinge upon objective lens 405 and the VIS/NIR is reflected (thus maintaining the resolution) and the LWIR energy is passed through a beam splitter 425 appropriately coated for reflection and transmission in the selected energy bands. The transmitted LWIR energy is detected by IRFPA 430 and is imaged via thermal imaging electronics 480 through a display (e.g., AMEL) 445 and subsequently, eyepiece 460 onto the viewer's eye 485. Though the LWIR image quality passing through the beam splitter 425 is somewhat degraded, the large pixels are less impacted by this fact.

The reflected VIS/NIR passes through image intensifier 440, mounted perpendicular to the line of sight. The image intensified VIS/NIR radiation is reflected by holographic filter 450, passes through eyepiece 455 and projects the image into the viewer's eye 490. The LWIR image is displayed 465 and passes through the holographic filter 450, combining with the VIS/NIR image in the eyepiece 455 and projects it into the viewer's eye 490.

Given the binocular configuration that results from the second preferred embodiment, a day visible camera could also be included to be displayed on both display screens 465 and 445. In this case, day zoom optics 475 act upon impinging visible light which is collected by a CCD and subsequently imaged onto the displays (e.g., AMEL) 465 and 445. For this visible scene (e.g., daylight scenario), the holographic filter 450 is switched so as to transmit all visible light, which passes through eyepiece 455 and impinges upon the viewer's eye 490.

As is apparent from the previous discussion, in FIG. 4(a), the switchable holographic filter 450 may be switched from nighttime mode where it reflects the P-43 yellow-green and transmits the selected false color of the LWIR sensor to the daytime mode where it has no optical effect and allows the visible to pass through to achieve a full color display. Using the switchable holographic filter 450 negates the need for mechanically moving the element in and out of the beam path. Alternatively, the switchable holographic filter 450 may be a simple beam combiner which at night reflects the P-43 yellow-green and transmits the selected false color of the LWIR sensor. During the day the beam combiner is moved out of the way to achieve a full color display.

In this second preferred embodiment, the first objective lens formed by at least the primary and secondary components 415 and 420, the II tube 440, and right eyepiece 460 must be fixed, the left eyepiece 455 can be moved to adjust for different users.

Referring to FIG. 4(b), an alternative configuration for a compact binocular 500 is shown. Compact binocular 500 images at least two separate energy bands. In this particular example, the two energy bands are LWIR and VIS/NIR. In particular, compact binoculars 500, project the image of the LWIR into both eyes 585, 590 of the viewer and images the VIS/NIR onto one eye 590 of the user. In order to achieve this dual imaging, the binoculars 500 utilize two separate objective lenses 505 and 605, one in each eye channel. Each objective lens 505, 605 is optimized for optical performance in its respective energy band. In FIG. 4(b), objective lens 505 is optimized for the VIS/NIR energy band, while objective lens 605 is optimized for the LWIR energy band.

After passing through the objective lens 505, VIS/NIR energy is reflected off of a prism (e.g., right angle prism) 525 and passes through an image intensifier 540. The intensified VIS/NIR energy impinges upon image combiner 550, where the intensified VIS/NIR is combined with the LWIR (described later), is reflected off of the combiner 550, passes through eyepiece 555 and into the viewer's eye 590.

Similarly, after passing through objective lens 605, LWIR energy impinges upon IR detector (e.g., IRFPA) 530 and is imaged onto display (e.g., AMEL) 565. The LWIR scene imaged from the display 565 is transmitted through image combiner 550, is combined with the VIS/NIR image, passes through eyepiece 555 and into the viewer's eye 590. At the same time that the IR detected radiation is being imaged on display 565, it is simultaneously being imaged onto display 545, where the LWIR image passes through eyepiece 560 and into viewer's eye 585. Thermal imaging electronics 580 control the imaging displays 545 and 565.

Compact binoculars 500 offer a number of viewing advantages to the user including, superimposition of the dual-band images to assure registration, maximum control of the image intensifier channel, and multiple-band imaging in one or both eyes.

In a fourth preferred embodiment of the present invention, the visible band is again imaged with at least one infrared band i.e., MWIR and LWIR, using a single objective lens configuration. In the fourth preferred embodiment, the visible band is not intensified electronically using an II tube and then imaged. Instead, the scene is imaged directly using available visible light in full color and displayed to the user like a standard handheld monocular telescope. The selected IR band is displayed monochromatically as an overlay in the eyepiece (the brightness of the wavelength used in the IR overlay may have to be reduced in the visible channel with a notch filter to enhance the overlay). The imaging scenario described above is achieved using the lens monocular configuration of FIG. 3(b), which depicts a visible/IR band imaging system 300 for simultaneously imaging full color visible with the selected IR band. The system 300 is comprised of a combination corrector lens (e.g., Cleartran®) 310, a primary component 315, a secondary component 320, an IR aberration correction lens 325, an IRFPA 330, field/image inverting lenses 335, an image erector component 342, and an imaging system 345 which includes an image combiner 350, an eyepiece 355, and a display (e.g., active matrix electroluminescent (AMEL) display) 360. Also included in the compact sensor are thermal imager electronics and controls 365.

In operation, all radiation bands 305 from a scene impinge upon the combination corrector lens/aperture stop 310 and reflect off of the primary component 315 towards the secondary component 320. The visible radiation component of the incoming radiation 305 reflects off of the secondary component 320 and passes through the remainder of the system and is projected into the eye 370 of the user. The IR radiation component of the incoming radiation 305 passes through the secondary component 320 and an IR aberration correction lens 325 and onto an IRFPA 330. The IRFPA digitally converts the IR radiation information through thermal control electronics 365 and images the IR scene through an AMEL 360. The converted IR monochromatic image from the AMEL 360 and the direct view full color visible image are combined at image combiner 350 and imaged by eyepiece 355 onto the user's eye 370.

For both the first and fourth preferred embodiments, using a compact 170 mm focal length catadioptric and the standard eyepiece, the result will be approximately a 6 degree field of regard for the image intensifier and likely somewhat less for LWIR. The second and third embodiments can be used with any combination of lenses in a handheld binocular configuration. Further, a likely configuration for the third embodiment is a helmet or head mounted goggles. In this case the lens and eyepiece focal lengths are selected so that the output is unity magnification. In this way the operator can walk, run and operate equipment normally. The field of regard for such a configuration is in the range of 40 to 60 degrees.

A standard 18 mm image intensifier tube is used in the preferred embodiments, but one skilled in the art recognizes that this parameter may vary depending on the desired size of the system and other system design requirements. Further, multiple IRFPA formats may be used including, but not limited to 160×120 and 320×240 with 46 to 51 micron pitch, and 320×240, and 640×480 with 25 to 28 micron pitch. The overall magnification of the first two embodiments described above is approximately a power of 7. The preferred embodiments of the present invention further contain various controls including on/off, range focus, LWIR polarity, and II/LWIR/overlay selection. To further exploit the resolution of the image tube, eyepiece zoom magnification may be included. Additionally, due to the compact nature of the systems it is possible to include auxiliary sensors such as a magnetic compass, GPS receiver and a range finder within the housing of the system. The data from these sensors may be provided to the user via, for example, the AMEL display regardless of whether or not the LWIR or MWIR image is selected. The IR digital video is also suitable for recording or relay using, for example, an RS-232 port to gain access to the thermal digital video.

While the embodiments discussed above are directed specifically to the design of a handheld multiple-band imager operating in the 130–200 mm focal length range, similar design approaches may be used to for special reconnaissance hide-sight imagers operating in the 250–350 mm focal length range and platform mounted imagers operating in the 500–700 mm focal length range. The different focal length requirements will result in the need for different objective lens components, but the same design approach of reflecting the visible and transmitting the LWIR through the secondary component is still applicable. In operation, a longer focal length results in the following trends (a) bigger obscuration formed by the secondary component, (b) easier packaging, (c) more expensive components due to their size. Generally, the LWIR drive electronics, image intensifier, housing, controls and eyepiece will remain the same for each focal length range.

The preferred embodiments discussed above are based on an existing uncooled IRFPA technology, specifically for the handheld version the IRFPA is 160×120 or 320×240 with a 25 to 51 micron pitch (e.g., supplied by Boeing, Lockheed Martin and Raytheon), with corresponding drive electronics. The IRFPA is located such that the available array can be removed and a new array positioned at the same location for demonstration and comparison. As IRFPA technology improves, the imagers can also be designed so as to be used as a test-bed for any new FPA configurations, as the arrays and drive electronics become available. The multiple-band imaging devices described herein may be powered by any conventional source, self-contained or otherwise, including, for example, a battery pack.

Figure 5B:
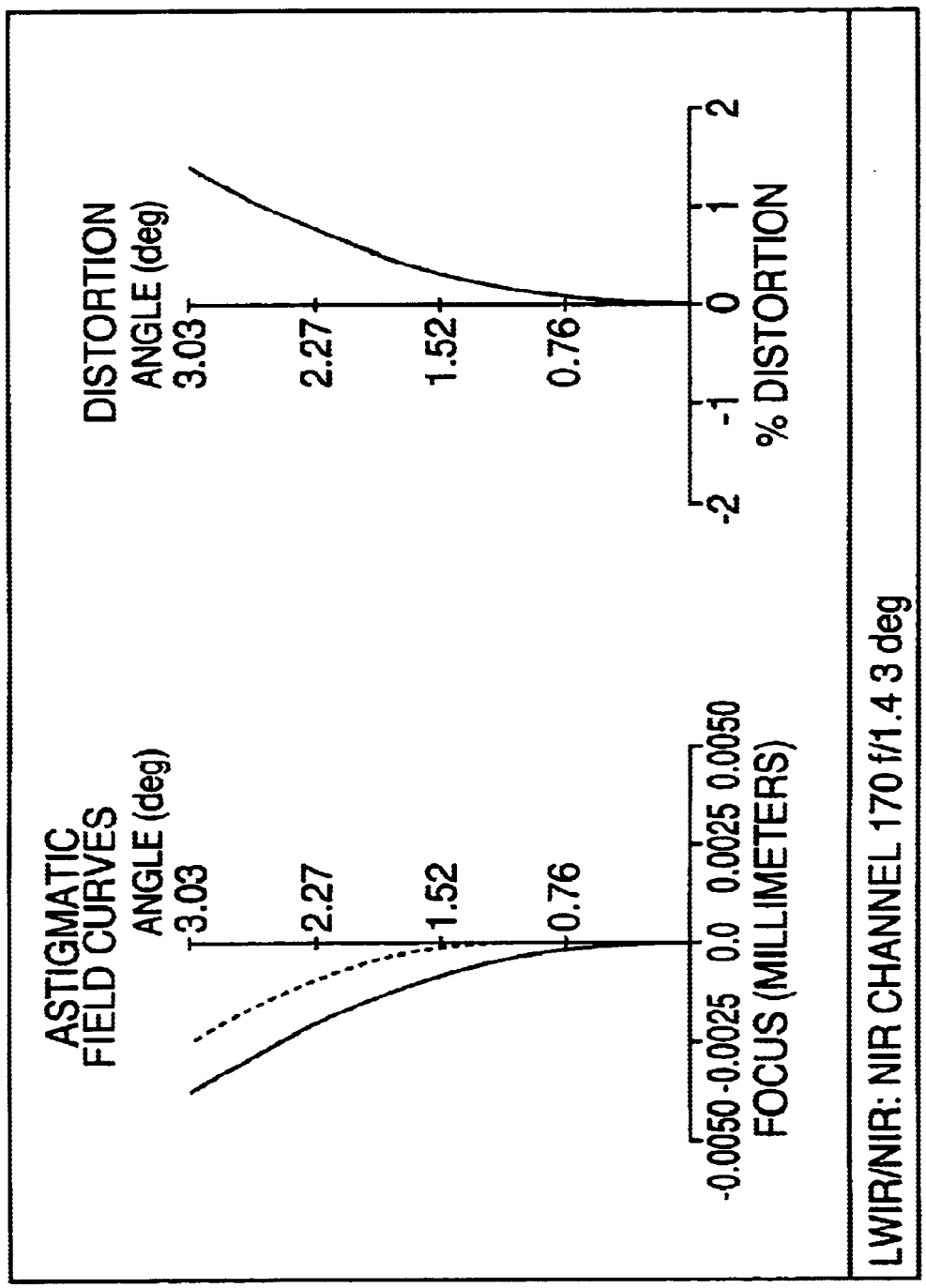

Returning to the objective lens designs contemplated by the invention (See FIGS. 1 and 2), for a monochromatic situation (one wavelength for the visible and the LWIR bands), the first-order parameters for a two-mirror objective have been explored to determine the acceptable power distribution in the primary and secondary mirrors. By way of example, a preferred design is f/1.4 with a 121 mm entrance aperture (170 mm focal length), mirror separation of approximately 58.5 mm, linear obscuration of approximately 0.30 (36 mm diameter), and the II tube protruding into the mirror system. An aperture stop with a corrector element is located in front of the two-mirror system to aid in the control of aperture aberrations (it also seals the unit from the outside environment). One or more field lenses near the II tube are needed to aid in the control of field aberrations. Some monochromatic performance results for the objective lens of FIG. 1 are illustrated in FIGS. 5(a) and 5(b). FIG. 5(a) illustrates the Modulation Transfer Function (MTF) plot of the feasibility design for the II channel of the objective lens. As indicated in the FIG. 5(a), the performance of the feasibility design across the field of view (II tube format) is nearly diffraction limited for all spatial frequencies from the effective Nyquist frequency of the II tube on down. In other words, the optics-detector combination is detector limited in this monochromatic design analysis. This high level of monochromatic performance in the design establishes the feasibility of creating high quality imagery while leaving room for achromatizing it over the required spectral band, lens design simplification, fabrication tolerances, and other such tradeoffs.

The astigmatism and distortion of the II channel lens design are indicated in FIG. 5(b). The smooth monotonic nature of the astigmatism curves indicate that the lens design minimizes field aberration and that there is no higher-order aberration balancing occurring in order to achieve the high level of performance indicated in FIG. 5(a). The distortion curve is also monotonic and has a low magnitude out to the edge of the field.

Figure 6A:
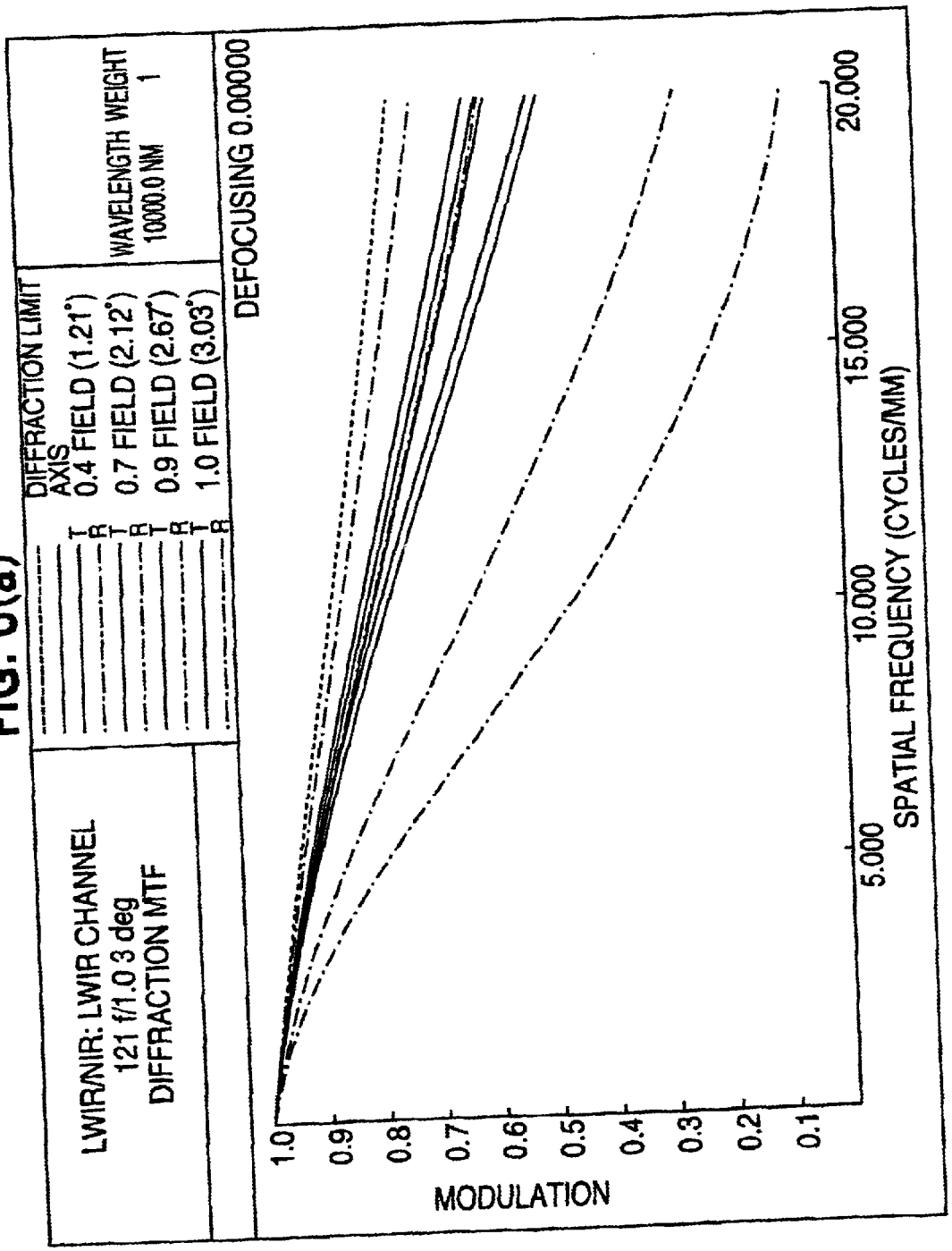
FIGS. 6(a) and 6(b) are monochromatic MTF performance graphs for LWIR energy passing through a lens configuration according to an embodiment of the present invention.
Figure 6B:
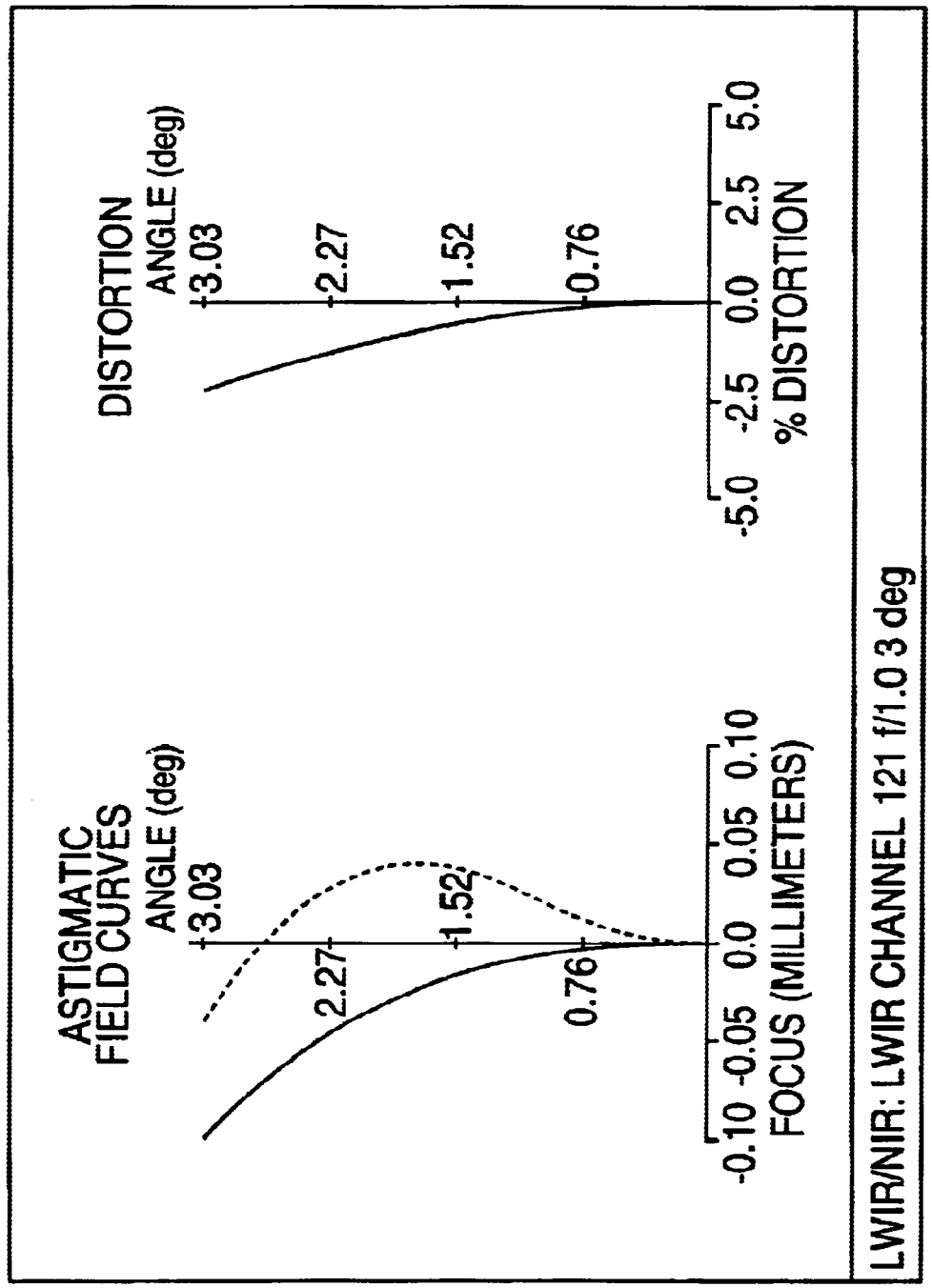

Referring to FIGS. 6(a) and 6(b), the lens configuration of the LWIR channel of FIG. 2 is also explored with a monochromatic lens design. FIG. 6(a) illustrates the MTF plot of the design for the LWIR channel. The performance is very good on axis and over most of the field of view, relative to the diffraction limit, with a fall off at the corner of the detector. Due to the fact that the user will only use the field for acquisition over the scene being viewed and then bring the object of interest to the center of the field of view, this drop off in performance at the corner is not considered a significant detriment in this feasibility design.

The astigmatism and distortion of the LWIR channel lens design are indicated in FIG. 6(b). The smooth nature of the astigmatism curves indicates that the design does not have higher-order field aberrations. The distortion curve is monotonic and has a low magnitude out to the edge of the field. This result indicates that controlling of the distortion of the LWIR channel with respect to the II channel is achievable to a close agreement level between the two channels. In order to optimize the objective lens design for a multiple-band imager, multiple parameters may be required and/or considered.

Basic optical parameters of the multi-band objective lens include the effective focal length (EFL) which is preferably between 130 and 200 mm; relative aperture (f/n) which is preferably 1.5 to 1.0 or faster for the IR channel(s); pupil diameter which is, for example, 121 mm for EFL of 170 mm, pupil linear obscuration minimized to between approximately 0.25 and 0.3, wavelength band imaging between 0.6 to 14 $\mu$m, and selection of detectors for both the VIS/NIR, the MWIR, and the LWIR.

Optical performance parameters which need to be maximized in the lens design of the multiband objective lens besides the imagery include reflection/transmission per surface, transmission per lens system, relative illumination uniformity. Optical performance parameters that are to be minimized include ghosts, distortion, and any vignetting.

To optimize the optical performance (e.g., minimize chromatic aberration and other distortions) of the objective lens, the sphericity or asphericity of the corrector lens, primary component, and/or secondary components is a parameter that may be manipulated. Depending on the intended end-use for the multiple-band imaging device, at least one of these components may be aspheric in order to meet specific optical criteria. Additionally, the use of different materials for the individual lenses comprising the corrector lens and the primary and secondary components, the use of a diffractive optical element (DOE) within the components, as well as the curvatures of the individual lens (e.g., positive, negative) may also be considered in order to optimize optical performance of the objective lens. Further, field lenses to correct for aberrations may also be used.

Figure 7A:
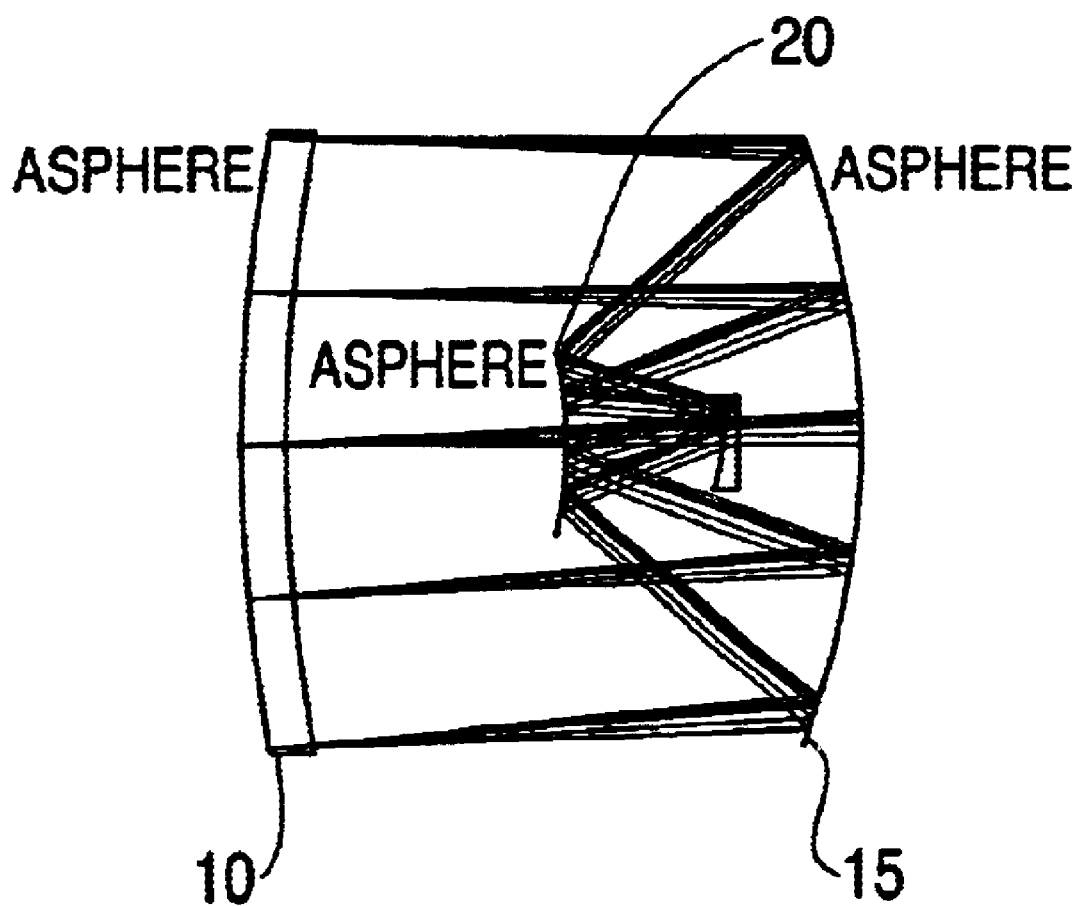
Figure 7B:
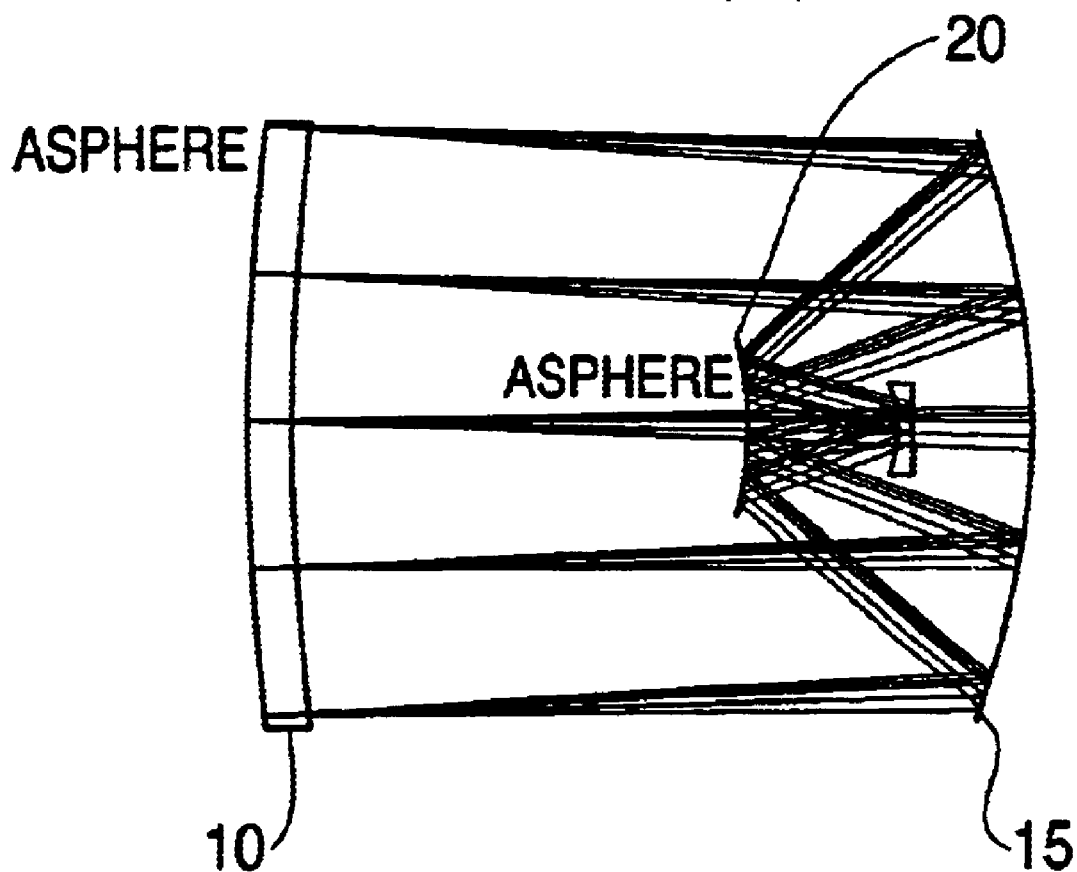
Figure 7D:
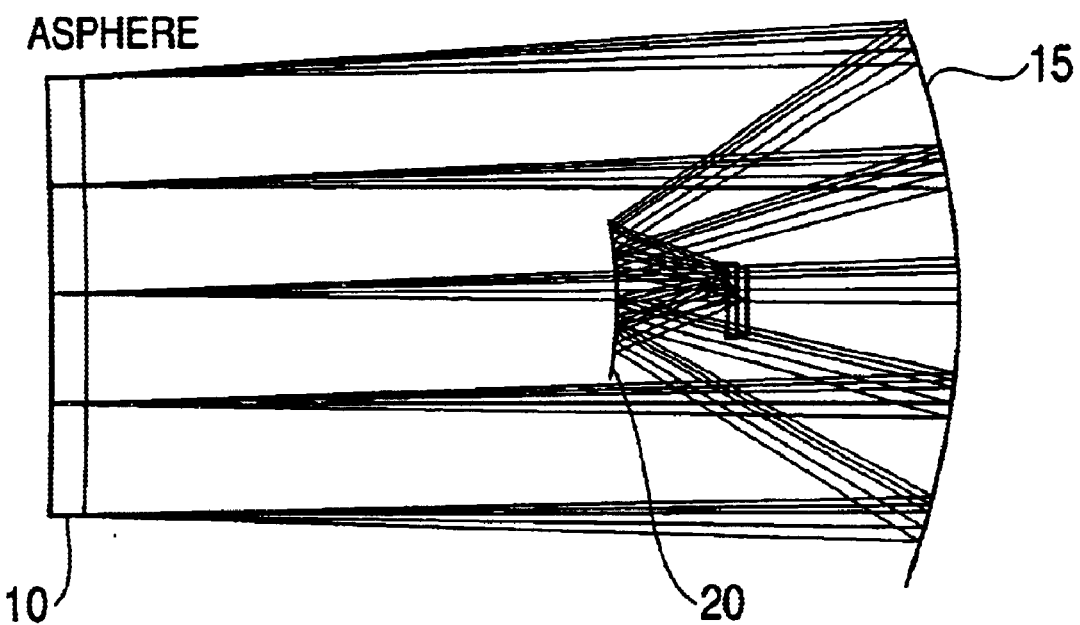

By way of example, other possible VIS/NIR optical configurations for this application from the monochromatic performance are shown in FIGS. 7(a) through 7(d). These embodiments vary based on the number and location of aspheric surfaces. In FIG. 7(a) all three major optical components the corrector lens 10, the primary component 15, and the secondary component 20 of the objective lens have aspheric surfaces. In FIG. 7(b) the corrector lens 10 and the secondary component 20 have aspheric surfaces. In FIG. 7(c) the corrector lens 10 and the primary component 15 have aspheric surfaces and in FIG. 7(d) only the corrector lens 10 has an aspheric surface.

Figure 8A:
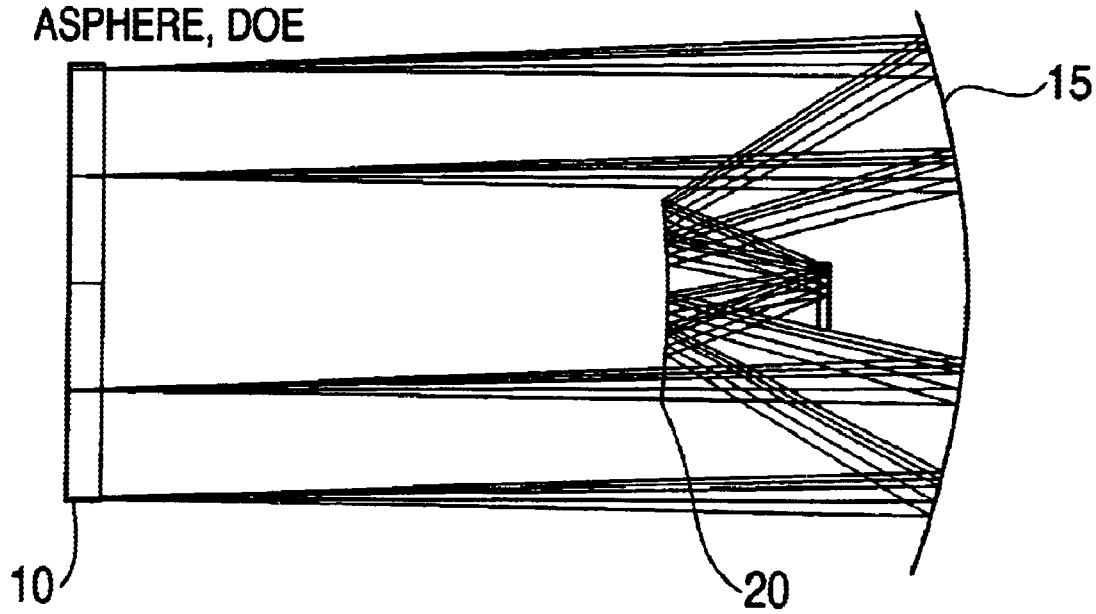
FIGS. 8(a)–8(f) are objective lenses according to embodiments of the present invention with FIGS. 8(g) and 8(h) are representative color-corrected MTF performance graphs for VIS/NIR energy passing through lens configurations 8(e) and 8(f), respectively.
Figure 8B:
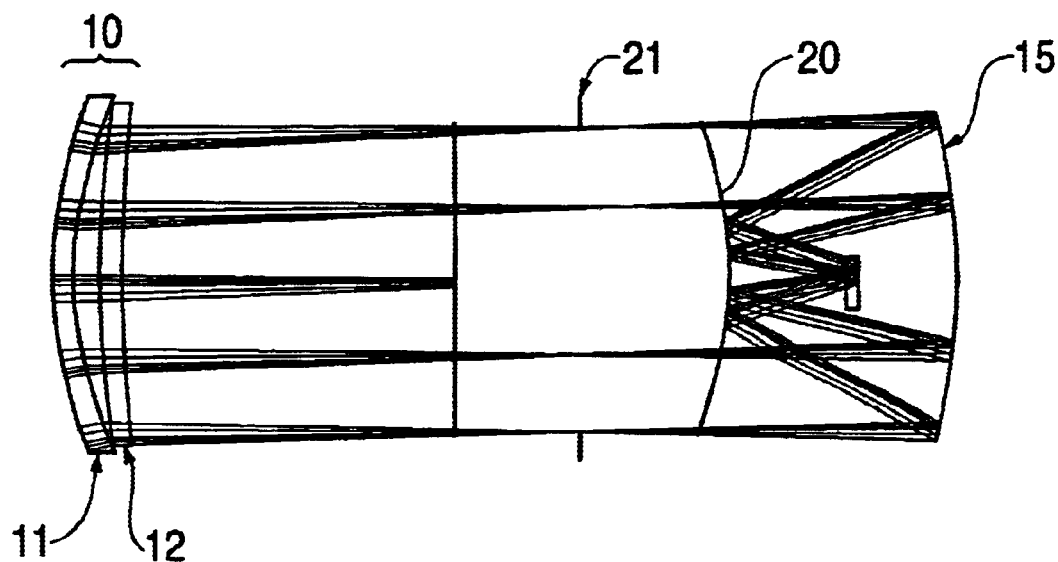
Figure 8C:
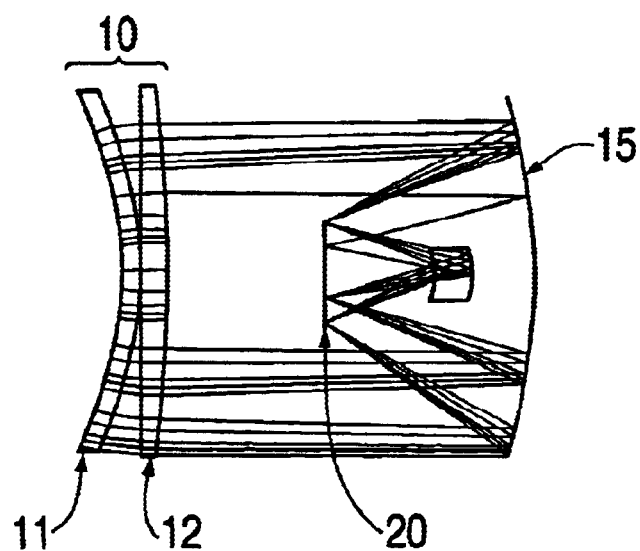
Figure 8D:
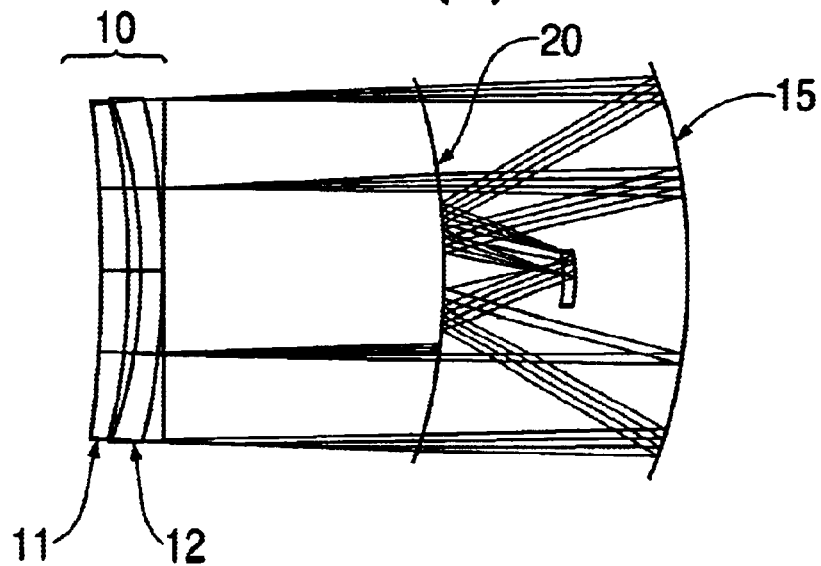
Figure 8E:
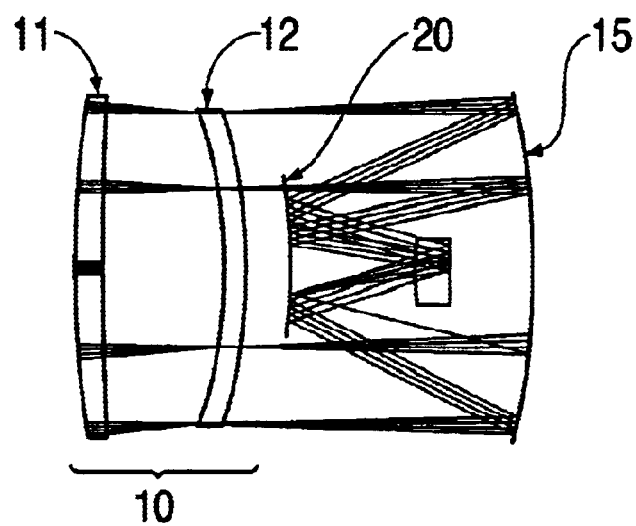
Figure 8F:
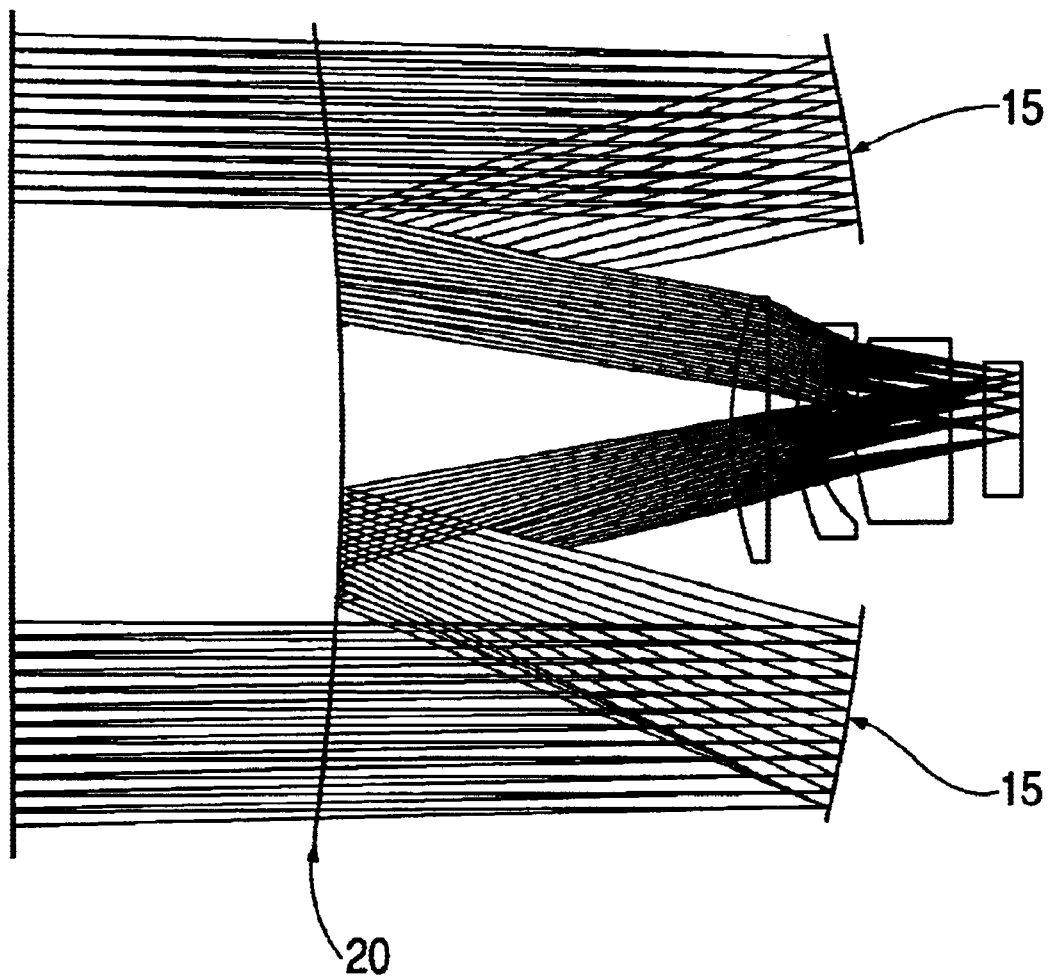
Figure 8G:
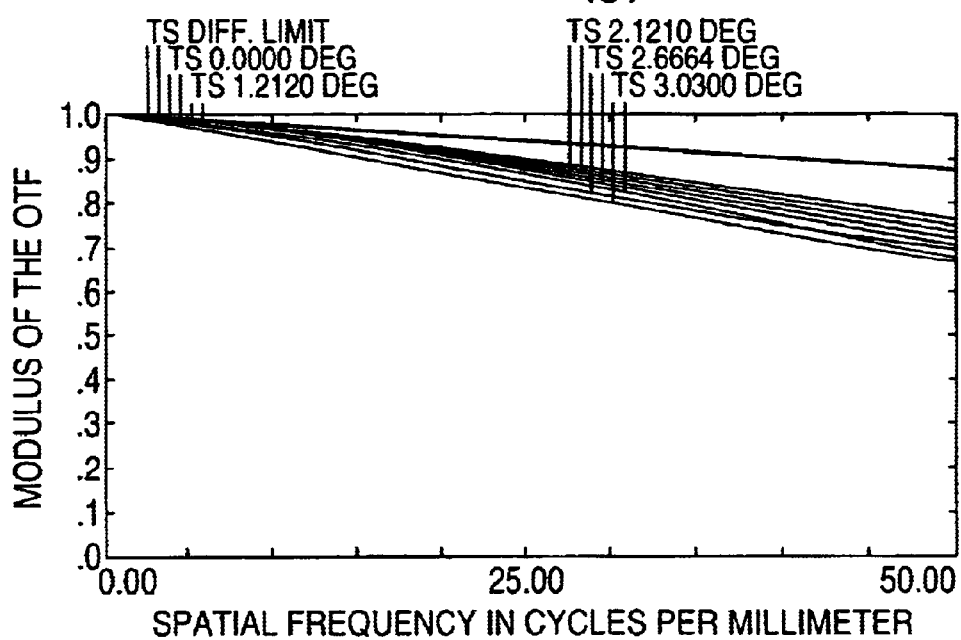
Figure 8H:
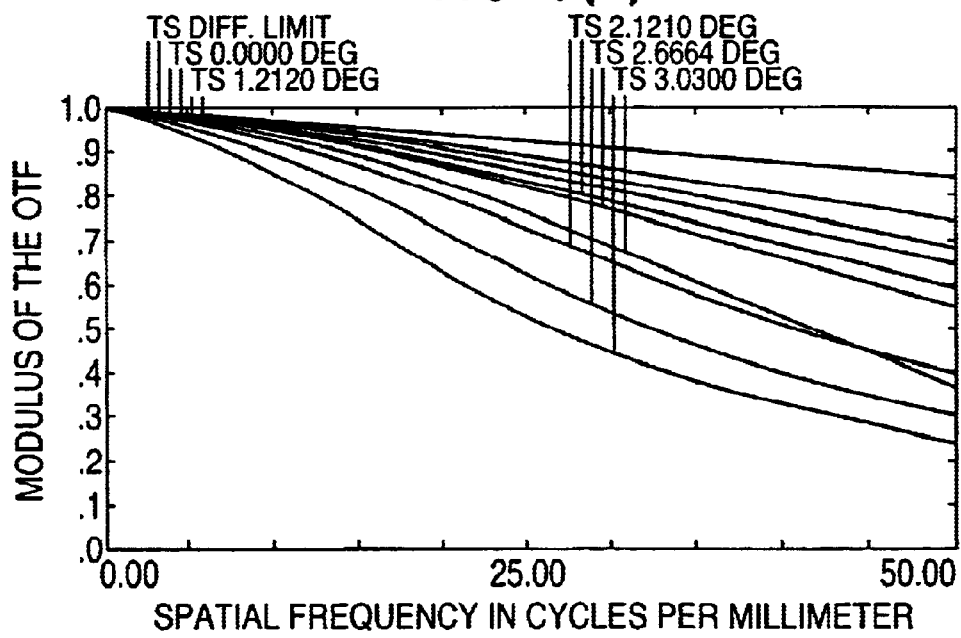

Referring to FIGS. 8(a) through 8(f), color-corrected lens design forms for the VIS/NIR band from 600–1,000 nm are presented. In FIG. 8(a), the primary and secondary components 15, 20 are spherical while the corrector lens 10 is aspheric and includes a DOE. In FIGS. 8(b) and 8(c), the corrector lens 10 is comprised of two lenses 11 and 12, having in order of incoming scene interaction, negative and positive overall power, respectively. All of the components, including the lenses 11, 12 and the primary and secondary components 15, 20 are spherical. Further the objective lens in FIG. 8(b) includes an aperture stop 21 located approximately midway between the corrector lens group and the primary component 15. In FIGS. 8(d) and 8(e), the corrector lens 10 is comprised of two lenses 11 and 12, having in order of incoming scene interaction, positive and negative overall power, respectively. All of the components, including the lenses 11, 12 and the primary and secondary components 15, 20 are spherical. By way of example, FIG. 8(g) illustrates the color-corrected modulation transfer function ("MTF") performance available to that of lens configuration depicted in FIG. 8(e) for the II channel. As depicted, performance is maximized in the center of the format where the device will be primarily be used. Additionally, the monochromatic lens design forms presented earlier can be designed to be color-corrected over the intended spectral band yielding a wide array of lens design choices to fulfill the specific design goals of the multi-band device. An alternate lens design form that is scalable to long focal length applications does not include an aperture corrector(s) in front of the objective. Instead, the aberration correction of these alternate lens designs is achieved with a more complex field lens group near the II tube input faceplate, see FIG. 8(f). For shorter focal length versions of this form, a thin, flat-surfaced window of appropriate material (e.g., zinc sulfide, zinc selenide) can be used to seal this more compact unit from the outside environment. By way of example, FIG. 8(h) illustrates the color-corrected MTF performance available to that of the lens configuration depicted in FIG. 8(f) for the II channel.

Figure 9A:
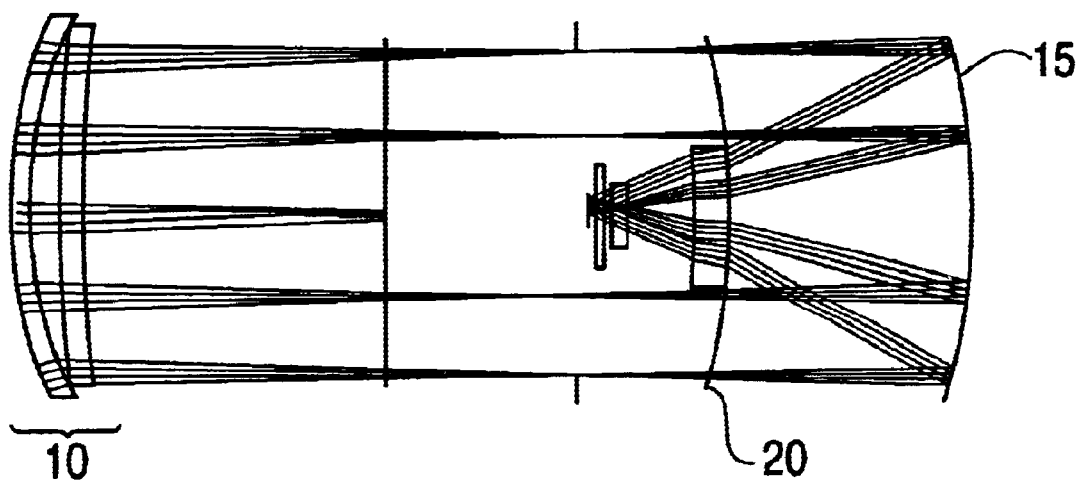
FIGS. 9(a)–9(b) are objective lenses according to embodiments of the present invention.
Figure 9B:
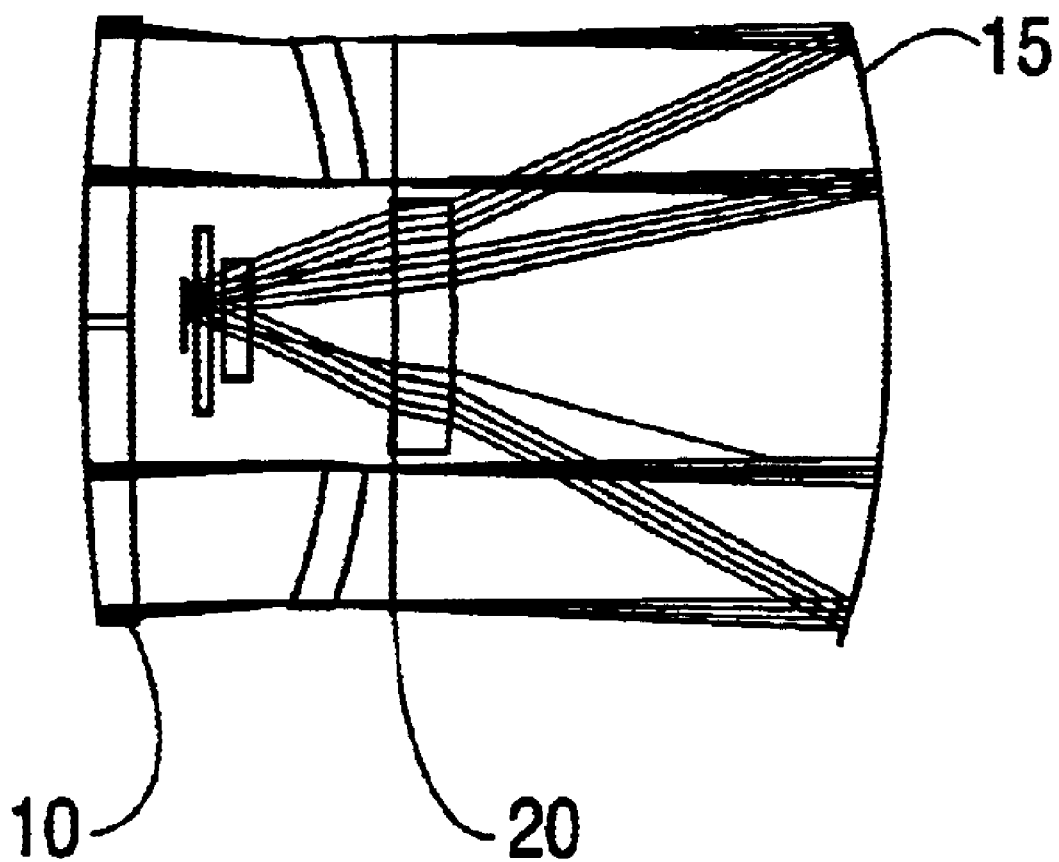
Figure 10A:
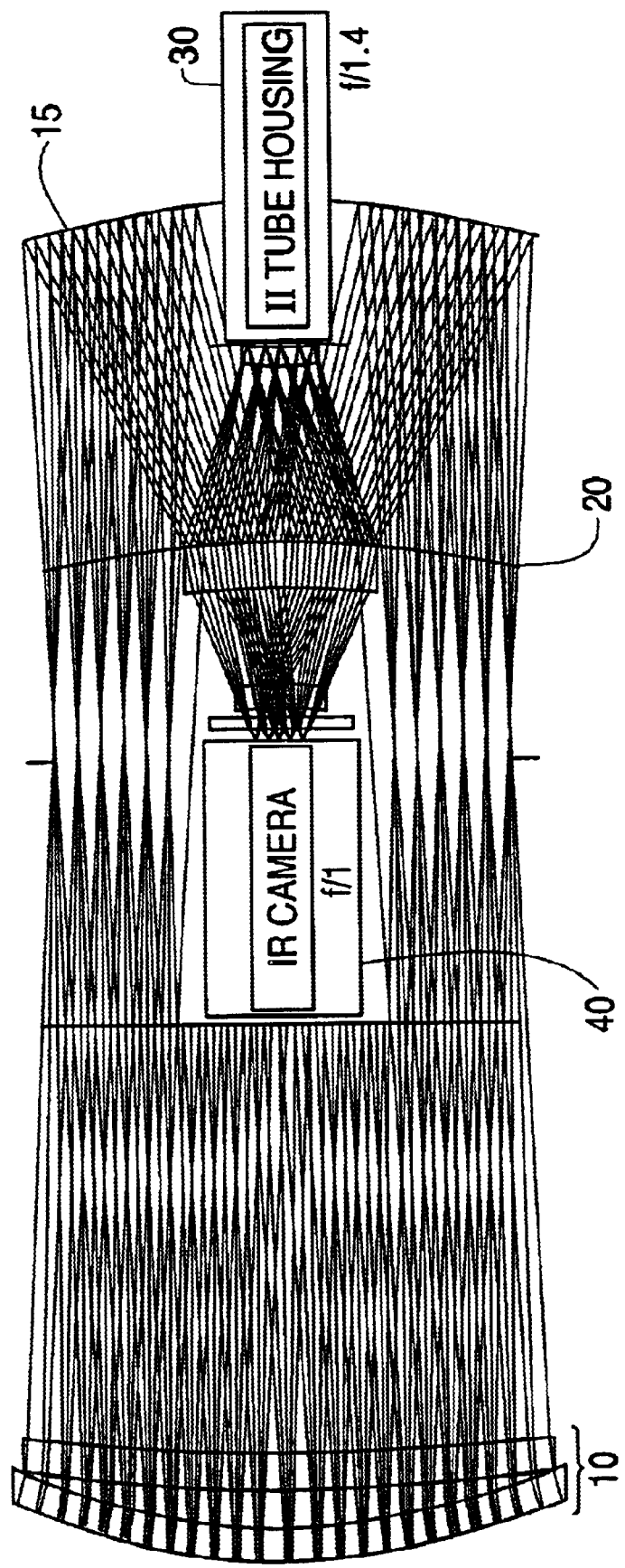
FIGS. 10(a) and 10(d) are objective lenses according to embodiments of the present invention and FIGS. 10(b), 10(c), 10(e), and 10(f) are MTF performance graphs for objective lenses 10(a) and 10(d), respectively.
Figure 10B:
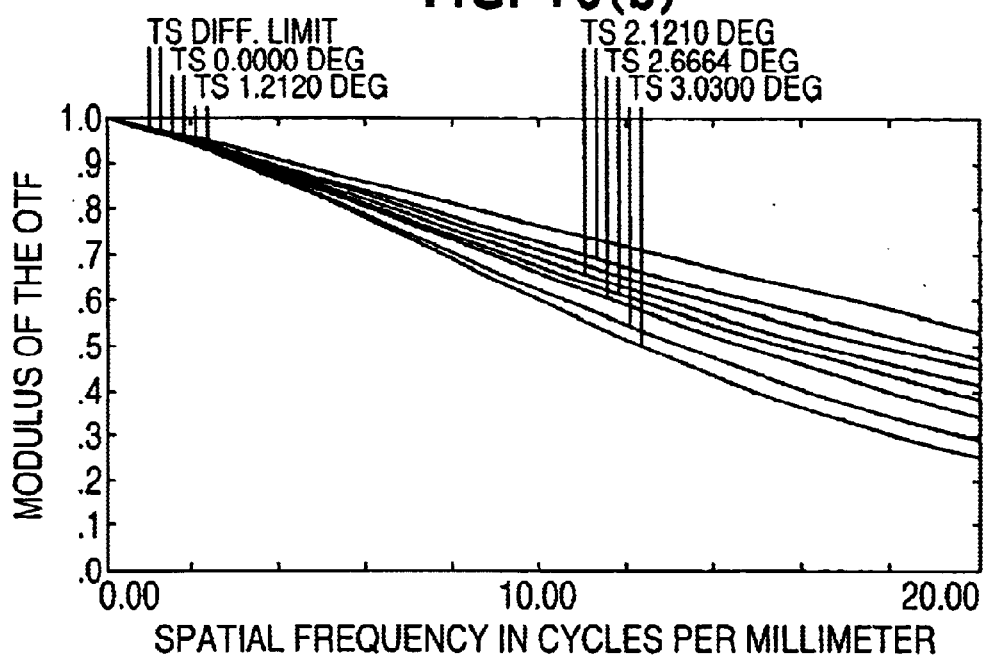
Figure 10C:
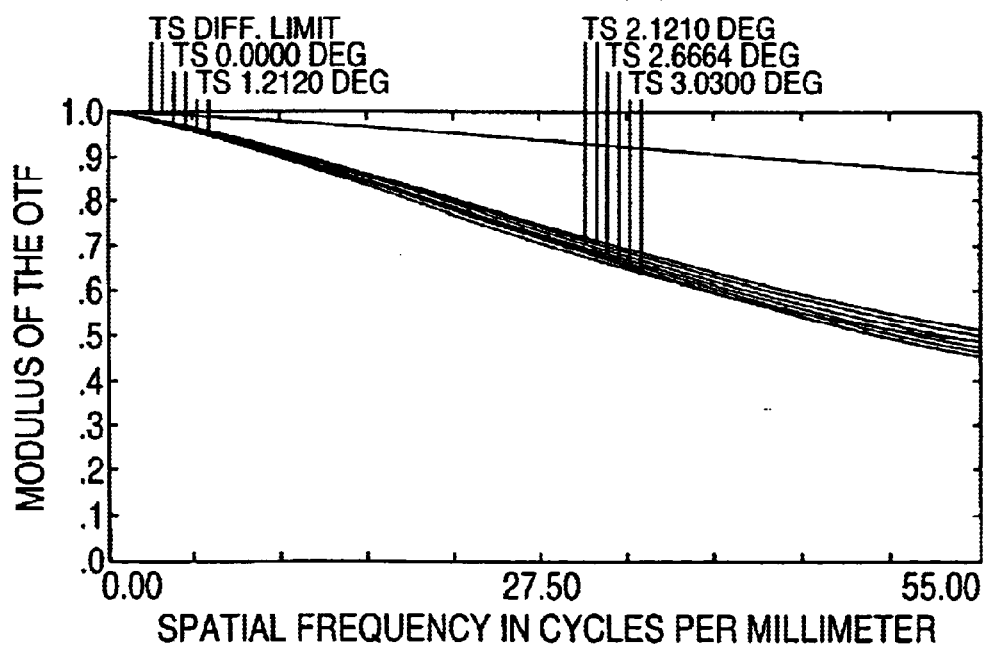
Figure 10D:
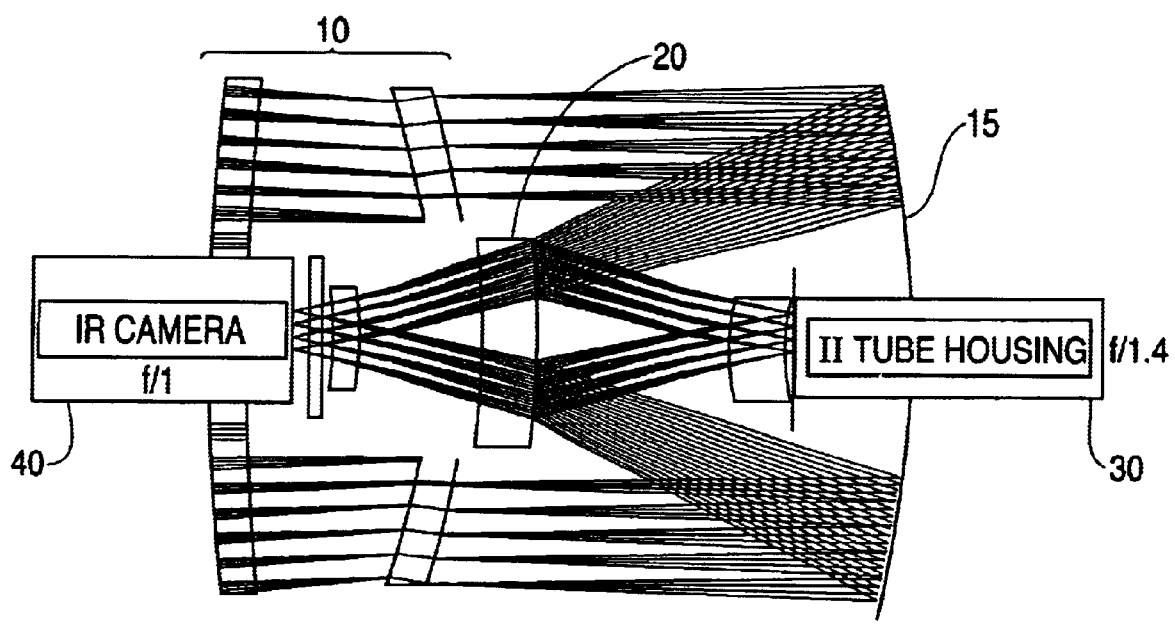
Figure 10E:
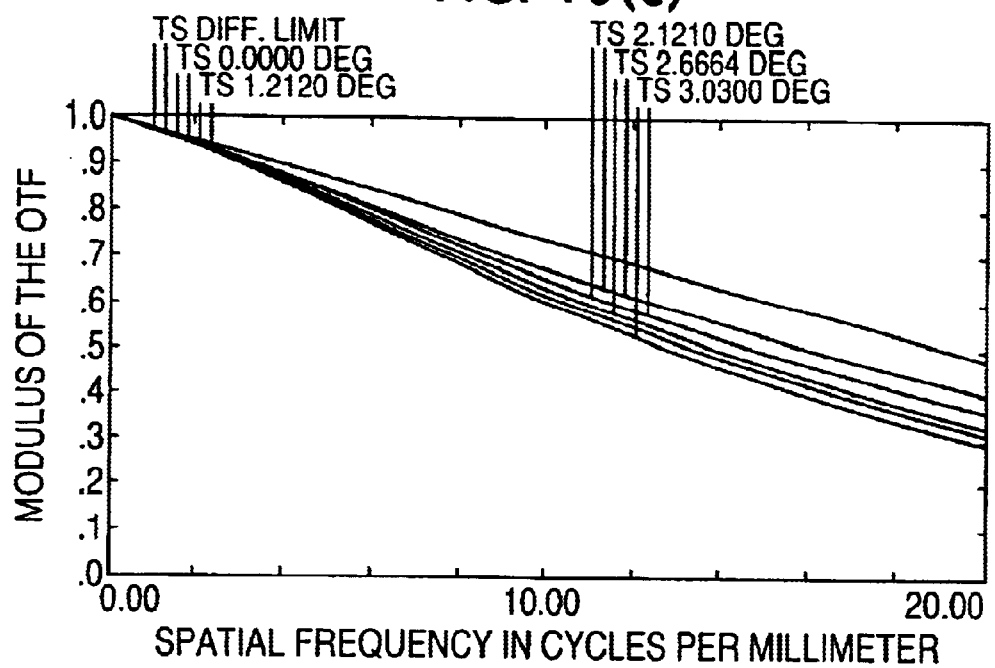
Figure 10F:
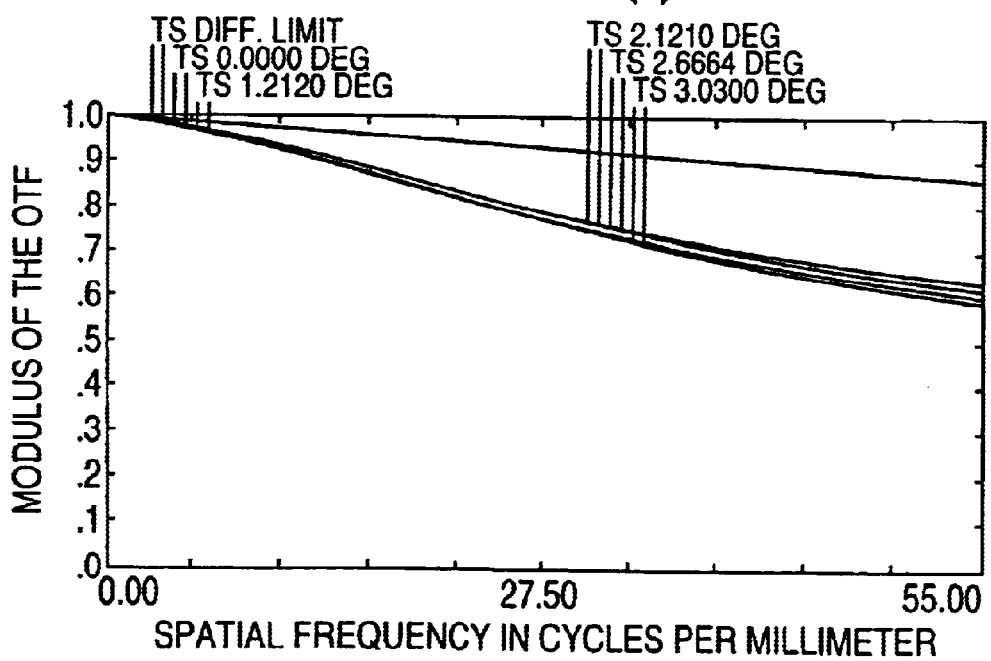

Referring to FIGS. 9(a) and 9(b), the LWIR band optical performance is also acceptable using the objective lens configurations of FIGS. 8(b) and 8(e), respectively. In FIG. 9(a), the three major optical components 10, 15, and 20 of the objective lens are all spherical. In the LWIR band, the radiation passes through the secondary component 20 unlike the VISINIR band, which is reflected by the secondary component 20. Similarly, in FIG. 9(b), the three major optical components 10, 15, and 20 of the objective lens are all spherical and the radiation passes through the secondary component 20. In FIGS. 10(a) and 10(d), the all-spherical objective lens configurations of FIGS. 8(b), 8(e), 9(a), and 9(b) are shown in combination, including the VIS/NIR and LWIR detectors 30 and 40. Further, FIGS. 10(b), 10(c), 10(e), and 10(f) depict the MTF performance for both the VIS/NIR and the LWIR components of comprising FIGS. 10(a) and 10(d), respectively. Also included in all of the FIGS. 7(a) through 10(f), are supporting optical components (e.g., aberration correction lenses) (not numbered) for both the VIS/NIR and the LWIR bands. These supporting optical components need not be specifically described herein as they are easily understood by those skilled in the art.

The IR lenses described above may be formed from any suitable material (e.g., zinc sulfide, zinc sulfide MS, zinc selenide, germanium) as is commonly understood by those skilled in the art. One skilled in the art readily understands that with the exception of those parameters detailed above, the optical parameters i.e., radius of curvature, index of refraction, diameter, material, etc., of all of the lenses including correction, field, primary, and secondary, used in the embodiments of the present invention are selectable based on the specific design requirements of each imaging system. As such, these particulars will not be discussed further herein.

The environmental parameters that are met by the preferred embodiments include those applicable to a handheld device used by military personnel, including temperature operational and storage range, shock, vibration, humidity and altitude. Commercial variations of these environmental parameters may be less demanding. The housing requirements met by the objective lens of the preferred embodiments include a sealed, protective front element and the capability for back-filling with a dry inert gas.

Packaging considerations taken into account in designing the preferred objective lenses of the present invention include filters and filter location with the objective system, window location, material, thickness distance from primary component, minimization of the number of elements comprising the objective, number of different optical materials used to compose the objective, types of surfaces (e.g., aspheric), length, diameter, and weight.

In order to allow for simultaneous range focusing, a preferred approach contemplated by this invention is to move the primary component in relationship to the secondary component, a technique that is used in other catadioptric lens applications. In this manner both wavebands will be adjusted for range. Alternatively, a second approach is to move the entire lens in relationship to the II tube and use a follower mechanism (mechanical or electrically driven) for the LWIR section. A third approach is to move the field lens(es) in front of the II tube and a follower mechanism in the LWIR optical path.

In order to keep multiple channels in simultaneous focus over the full temperature range, selection of materials for the housing and mounting brackets is made to achieve uniform focus over the range. An alternate to housing material selection for uniform focus over full temperature range is to use an electronically controlled thermal focus adjustment to compensate for discrepancies between channels when standard housing materials are used.

The applications for this type of multiple-band imaging system are numerous. To take a specific example, a fire fighter, equipped with the visible/IR imaging system above, is able to go from daylight into a smoke-filled building and vice versa and maintain some amount of visual contact without ever removing the imaging system or having to switch between multiple imaging systems or components. Further, the firefighter need not choose between visible and IR, but may simultaneously maximize his/her viewing capability by utilizing both views at all times. Other applicable users include all emergency personnel (e.g., police, search & rescue), the military, sportsman (e.g., hunters), ship operators, aircraft operators, and the like. This type of compact imaging system is useful in any situation where there could be a fluctuation or shift from visible to IR viewing conditions and vice versa.

We claim:

1. Multiple-band radiation imaging binoculars for imaging at least two bands of radiation onto at least one eye of a viewer comprising:

a first objective lens for imaging a first band of incoming radiation, wherein the first band of incoming radiation passes through the first objective lens in a first direction;

a first optical element for receiving the first band of incoming radiation and redirecting the first band of radiation in a second direction, wherein the second direction is at approximately a 90 degree angle to the first direction;

a first sensor for receiving the first band of incoming radiation in the second direction, wherein the first sensor intensifies the first band of incoming radiation;

a second optical element for receiving the intensified first band of incoming radiation and redirecting the intensified first band of radiation in a third direction, wherein the third direction is at approximately a 90 degree angle to the second direction and is the same direction as the first direction;

a first eyepiece for imaging the intensified first band of radiation onto a first eye of the viewer;

a second objective lens for imaging a second band of incoming radiation, wherein the second band of incoming radiation passes through the second objective lens in the first direction;

a second sensor for receiving the second band of incoming radiation, wherein the second sensor images the second band of incoming radiation on a first and a second display device, wherein the second band of incoming radiation is imaged from the first display device onto the first eye of the viewer via the first eyepiece; and a second eyepiece lens for imaging the second band of incoming radiation from the second display device onto a second eye of the viewer, such that the first band of incoming radiation is imaged onto one eye of the viewer and the second band of incoming radiation is imaged onto both eyes of the viewer.

2. The multiple-band radiation imaging binoculars of claim 1, wherein the first band of incoming radiation is VIS/NIR radiation.

3. The multiple-band radiation imaging binoculars of claim 1, wherein the second band of incoming radiation is mid-wavelength infrared radiation.

4. The multiple-band radiation imaging binoculars of claim 1, wherein the second band of incoming radiation is long-wavelength infrared radiation.

5. The multiple-band radiation imaging binoculars of claim 1, wherein the second sensor is an uncooled infrared focal plane array.

6. The multiple-band radiation imaging binoculars of claim 1, wherein the second sensor is an image intensification device.

7. Multiple-band radiation imaging binoculars for imaging at least two bands of radiation onto at least one eye of a viewer comprising:

a first objective lens for imaging a first band of radiation;

a first optical element for receiving the first band of radiation from the first objective lens and directing the first band of radiation in the direction of a first eyepiece;

a first sensor for receiving the first band of radiation from the first optical element, wherein the first sensor intensifies the first band of radiation;

a second optical element for receiving the intensified first band of radiation and directing the intensified first band of radiation to the first eyepiece;

a second objective lens for imaging a second band of radiation; and a second sensor for receiving the second band of radiation, wherein the second sensor images the second band of radiation on a first and a second display device, wherein the second band of radiation is imaged from the first display device onto the second optical element, along with the intensified first band of radiation, and is directed to the first eyepiece and the second band of radiation is imaged from the second display device onto a second eyepiece.

8. The multiple-band radiation imaging binoculars of claim 7, wherein the first band of incoming radiation is VIS/NIR radiation.

9. The multiple-band radiation imaging binoculars of claim 7, wherein the second band of incoming radiation is mid-wavelength infrared radiation.

10. The multiple-band radiation imaging binoculars of claim 7, wherein the second band of incoming radiation is long-wavelength infrared radiation.

11. The multiple-band radiation imaging binoculars of claim 7, wherein the second sensor is an uncooled infrared focal plane array.

12. The multiple-band radiation imaging binoculars of claim 7, wherein the first optical element is a prism.

13. The multiple-band radiation imaging binoculars of claim 7, wherein the second optical elements is an image combiner.

14. The multiple-band radiation imaging binoculars of claim 7, wherein the first sensor is an image intensification device.

15. A method for imaging multiple bands of radiation onto at least one eye of a viewer comprising:

receiving a first band of radiation onto a first imaging element;

imaging the first band of radiation onto a first directing element wherein the first directing element directs the first band of radiation to a an intensifier element;

intensifying the first band of radiation to form an intensified first band of radiation;

receiving a second band of radiation onto a second imaging element;

imaging the second band of radiation onto a sensor;

imaging the second band of radiation from the sensor onto each of a first and second display device;

imaging the intensified first band of radiation and the second band of radiation from the first display device onto a first eyepiece, wherein the first eyepiece images the combined bands onto the at least one eye of the user; and imaging the second band of radiation from the second display device onto a second eyepiece.

16. The method according to claim 15, further comprising combining the intensified first band of radiation with the second band of radiation from the first display device prior to imaging the combined bands of radiation onto the first eyepiece.

17. Multiple-band radiation imaging system for imaging at least two bands of radiation comprising:

an objective lens for imaging a first and a second band of radiation, wherein the objective lens includes a first optical element for reflecting the at least two bands of incoming radiation and a second optical element for reflecting a first of the at least two bands of radiation and transmitting a second of the at least two bands of radiation;

a third optical element for receiving the first band of radiation from the objective lens and directing the first band of radiation onto a first receiving device;

a sensor for receiving the second band of radiation, wherein the sensor images the second band of radiation onto a first and a second display device, wherein the second band of radiation is imaged from the first display device onto a fourth optical element and is subsequently directed to a second receiving device; and further wherein the second band of radiation is directed from the second display device through the third optical element and onto the first receiving device.

18. The imaging system according to claim 17, further comprising a corrective element for correcting aberrations in the at least two bands of radiation.

19. The imaging system according to claim 18, wherein the corrective element comprises:

a first lens having positive refractive power; and a second lens having negative refractive power.

20. The imaging system according to claim 19, wherein the corrective element, including the first and second lenses, the first optical component, and the second optical component are comprised of spherical surfaces.

21. The imaging system according to claim 19, wherein the corrective element, including the first and second lenses, the first optical component, and the second optical component are comprised of aspherical surfaces.

22. The imaging system according to claim 19, wherein at least one of the first and second lenses of the corrective element, the first optical component, and the second optical component includes at least one aspherical surface.

23. The imaging system according to claim 18, wherein the corrective element comprises:

a first lens having a negative refractive power; and a second lens having a positive refractive power.

24. The imaging system according to claim 23, wherein the corrective element, including the first and second lenses, the first optical component, and the second optical component are comprised of spherical surfaces.

25. The imaging system according to claim 23, wherein the corrective element, including the first and second lenses, the first optical component, and the second optical component are comprised of aspherical surfaces.

26. The imaging system according to claim 23, wherein at least one of the first and second lenses of the corrective element, the first optical component, and the second optical component includes at least one aspherical surface.

* * * * *